(12) United States Patent
Kikuchi et al.

(10) Patent No.: US 7,340,497 B2
(45) Date of Patent: Mar. 4, 2008

(54) SIGNAL PROCESSING DEVICE AND SIGNAL PROCESSING METHOD

(75) Inventors: Atsushi Kikuchi, Kanagawa (JP); Hiroyuki Honma, Chiba (JP); Kyoya Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 137 days.

(21) Appl. No.: 11/023,333

(22) Filed: Dec. 27, 2004

(65) Prior Publication Data
US 2005/0108003 A1  May 19, 2005

Related U.S. Application Data

(62) Division of application No. 09/821,220, filed on Mar. 29, 2001, now abandoned.

(30) Foreign Application Priority Data

Mar. 29, 2000 (JP) ............ P2000-095310

(51) Int. Cl.
*G06F 17/14* (2006.01)
(52) U.S. Cl. .................................... 708/402
(58) Field of Classification Search ......... 708/400–409
See application file for complete search history.

(56) References Cited

U.S. PATENT DOCUMENTS

| | | | |
|---|---|---|---|
| 4,447,886 A | 5/1984 | Meeker | |
| 5,005,189 A | 4/1991 | Hackett | |
| 5,218,561 A | 6/1993 | Iwadare | |
| 5,349,549 A | 9/1994 | Tsutsui | |
| 5,454,011 A * | 9/1995 | Shimoyoshi | ................. 375/240 |
| 5,640,421 A * | 6/1997 | Sonohara et al. | ........... 708/402 |
| 5,646,960 A | 7/1997 | Sonohara et al. | |
| 5,831,883 A | 11/1998 | Suter et al. | |
| 5,890,106 A | 3/1999 | Bosi-Goldberg | |
| 6,266,687 B1 | 7/2001 | Leyonhjelm et al. | |
| 6,611,855 B1 | 8/2003 | Hellberg et al. | |
| 6,794,996 B2 * | 9/2004 | Tsutsui et al. | ................. 341/50 |

FOREIGN PATENT DOCUMENTS

JP     05-183442     7/1993

OTHER PUBLICATIONS

Deepen et al., Audio Compression at Low Bit Rates using a Signal Adaptive Switched Filterbank, 1996, IEEE, pp. 1053-1056.*

(Continued)

*Primary Examiner*—Chat C. Do
(74) *Attorney, Agent, or Firm*—Sonnenschein Nath & Rosenthal LLP

(57) ABSTRACT

A signal processing device and method for performing a code string transform by transforming a time series signal with a frequency band from 0 to 20 kHz from a coding system into another, wherein the arithmetic operations of MDCT and IMDCT with a limited frequency band from 0 to 15 kHz are carried out at high speed by performing computations using an FFT operation with a short tap length in the IMDCT processing operation. This allows a reduced work area and a higher speed for arithmetic operations by reducing the number of multiplications and additions when performing MDCT operations, IMDCT operation and/or transforming code strings between different coding system.

16 Claims, 20 Drawing Sheets

OTHER PUBLICATIONS

T. Mochizuki, et al., *The Restricting Conditions for Filters for the MDCT Using a Mixture of a Plurality of Block Sizes*, Bulletin of Science and Technology for Telecommunications CAS90-10 DSP90-14, pp. 55-60.

F. Hazu, et al., *The adaptive Transform Coding With Adaptive Block Lengths Using the MDCT (ATC-ABS)*, The Papers for the Speeches in the 1999 Spring National Conference of the Society of Electronic Information and Telecommunications, A-197.

A. W. Johnson, et al., "*Frequency Scalable Video Coding Using the MDCT*", Apr. 1994, IEEE, vol. V, pp. 477-480.

* cited by examiner

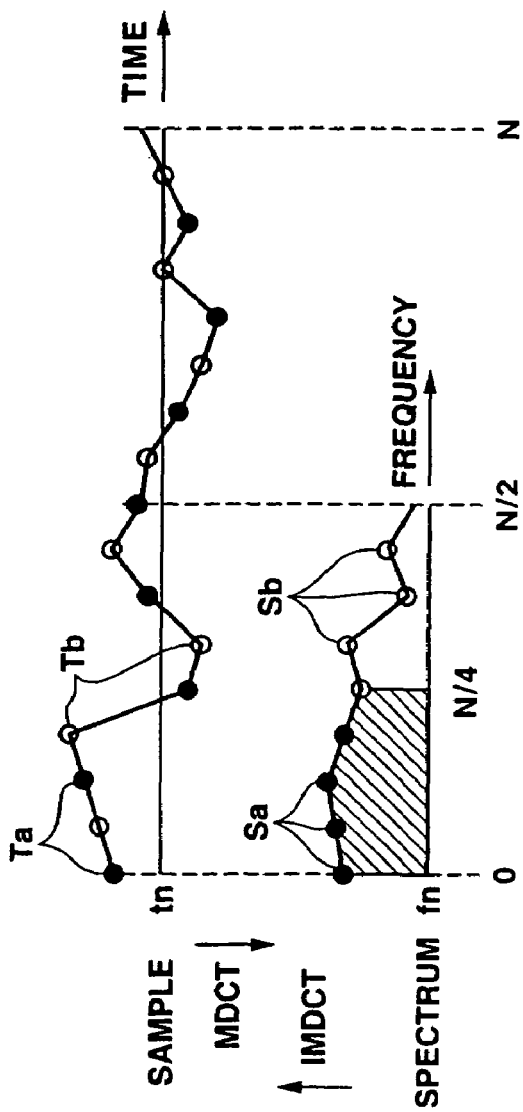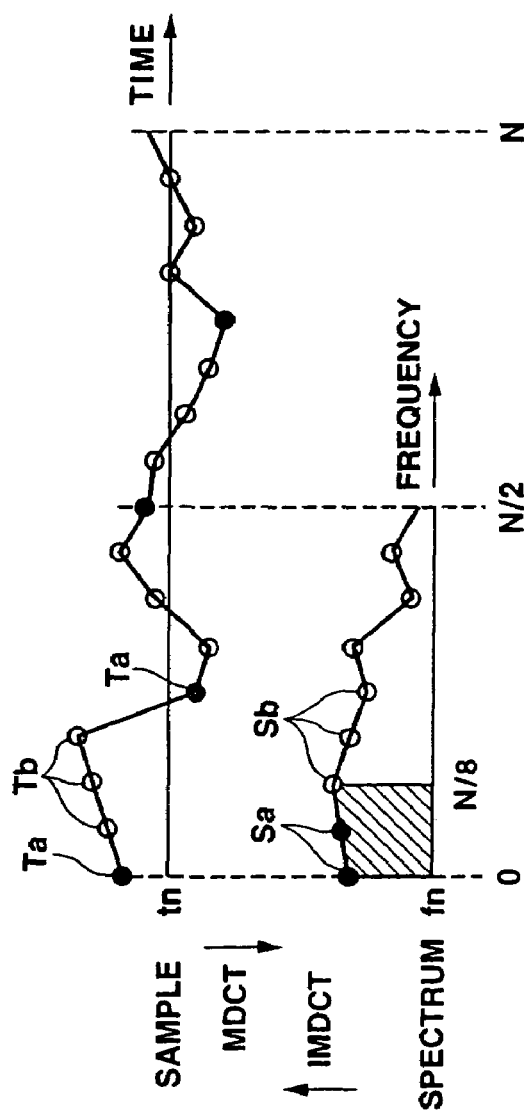
FIG.2A
FIG.2B
PRIOR ART

SIGNAL PROCESSING DEVICE AND SIGNAL PROCESSING METHOD

RELATED APPLICATION DATA

This application is a divisional of application Ser. No. 09/821,220 filed Mar. 29, 2001, now abandoned. The present and foregoing applications claim priority to Japanese Application No. P2000-095310 filed on Mar. 29, 2000. Each of these applications is incorporated herein by reference to the extent permitted by law.

BACKGROUND OF THE INVENTION

This invention relates to a signal processing device and a signal processing method for performing forward transform computations and inverse transform computations of so-called improved discrete cosine transform (or modified DCT) at high speed for the purpose of realizing a linear transform of various digital signals such as audio signals and video signals and also for performing a code string transform from a coding system into another at high speed.

The orthogonal transform coding is known as a high efficiency coding technique adapted to high efficiency bit compression of a signal comprising time series sample data such as audio signal. With this transform coding technique, the input signal is subjected to an orthogonal transform coding operation on a block by block basis. The discrete cosine transform (DCT) is a typical orthogonal transformation. However, this transform technique is accompanied by the problem of block distortion that the discontinued boundary of adjacent blocks is perceived as noise. Therefore, adjacent blocks are normally made to overlap each other at the related ends.

The MDCT (modified DCT) is a technique for making the front and rear halves of each block of sample data overlap respectively the rear half of the preceding block and the front half of the succeeding block but not transmitting the samples of overlapped areas in duplicate. Therefore, it is highly suited to high efficiency coding operations.

The MDCT and the IMDCT (inverse MDCT) are described in a number of papers including Mochizuki, Yano and Nishitani, "The Restricting Conditions for Filters for the MDCT using a Mixture of a Plurality of Block Sizes" (Bulletin of Science & Technology of Telecommunication, CAS90-10, DSP90-14, pp. 66-60) and Uzu, Sugiyama, Iwadare and Nishitani, "The Adaptive Transform Coding with Adaptive Block Lengths Using the MDCT (ATC-ABS)" (The Papers for the Speeches in the 1999 Spring National Conference of the Society of Electronic Information and Telecommunication, A-197). They will be briefly described below by referring to FIG. 1 of the accompanying drawing.

Referring to FIG. 1, any block, for instance the J-th block, of the input time series sample data overlaps the rear half (50%) of the (J−1)-th block and the front half (50%) of the (J+1)-th block. If the number of samples of the J-th block is N (natural number), it overlaps the (J−1)-th block by N/2 samples.

For instance, a preprocessing filter or a window for forward transform Wh is provided for the input time series samples 101 of the J-th block to reduce them into N time series data 102. The preprocessing filter or the forward transform window Wh is so selected as to maximize the power concentration of the transformed data in response to the statistic properties of the input signal.

Then, the time series data 102 for the N samples are subjected to a linear forward transform processing operation of MDCT to produce N/2 independent spectrum data 103 on the frequency axis, the number of which data is a half of that of the input samples.

Then, the N/2 spectrum data 103 are subjected to a linear inverse transform processing operation of IMDCT to become N time series data 104.

Then, a synthetic filter or a window for inverse transform Wh is provided for the time series data 104 to produce time series data 105, which is added to the output of the preceding block and that of the succeeding block to restore the original input time series sample data 105.

As for specific methods of performing arithmetic operations of MDCT or IMDCT, Japanese Patent Application Laid-Open No. 5-183442 filed by the applicant of this patent application proposes an MDCT method to be used for an input signal of N samples to obtain an output of N/2 spectrums by carrying out preprocessing and postprocessing operations on the input signal and performing an FFT (fast Fourier Transform) on the basis of N/4 samples and an IMDCT method to be used for an input signal of N/2 spectrum data to obtain an output of N samples by carrying out preprocessing and postprocessing operations on the input signal and performing an FFT on N/2 spectrums on the basis of a tap length corresponding to N/4 spectrums.

Now, the methods described in Japanese Patent Application Laid-Open No. 5-183442 will be summarily described below.

The defining equation of MDCT is given by formula (1) below.

$$y_0(k) = C_0 \sum_{n=0}^{N-1} x_0(n) h(n) \cos\left(\frac{\pi(2k+1)(2n+N/2+1)}{2N}\right), \quad (1)$$

$$\text{for } 0 \leq k \leq \frac{N}{2} - 1$$

where $x_0$ represents the MDCT input signal, N represents the block length, h represents the window function for forward transform, $y_0$ represents the MDCT output signal, $C_0$ represents a constant, n represents an integer between 0 and N−1 and k represents an integer between 0 and N/2−1. Since the MDCT processing operation is conducted on a block by block basis for the cut out time series data so as to separate each block, the block number J is omitted from the above formula. Additionally, since the value of $C_0$ essentially does not affect the method used for the MDCT, $C_0=1$ is assumed here for the sake of convenience.

When carrying out computations with the above formula, firstly window for forward transform is applied to $x_0$ to obtain $x_{01}$ as expressed by formula (2) below.

$$x_{01}(n) = x_0(n) h(n), \text{ for } 0 \leq n \leq N-1 \quad (2)$$

Then, $x_{02}$ is obtained from $x_{01}$ that is obtained by using formula (2) above by using formula (3) below.

$$x_{02}(n) = \begin{cases} -x_{01}\left(n + \frac{3N}{4}\right), & \text{for } 0 \leq n \leq \frac{N}{4} - 1 \\ x_{01}\left(n - \frac{N}{4}\right), & \text{for } \frac{N}{4} \leq n \leq N-1 \end{cases} \quad (3)$$

Then, $x_{03}$ is obtained by using formula (4) below.

$$x_{03}(n) = x_{02}(2n) - x_{02}(N - 1 - 2n), \quad (4)$$
$$\text{for } 0 \leq n \leq \frac{N}{2} - 1$$

Subsequently, a complex signal string $Z_{01}$ is formed by using formula (5) below.

$$z_{01}(n) = (x_{03}(2n) + jx_{03}(2n+1))\exp\left(-j\frac{2\pi n}{N/2}\right), \quad (5)$$
$$\text{for } 0 \leq n \leq \frac{N}{4} - 1$$

The obtained complex signal string $Z_{01}$ is subjected to FFT on the basis of a length of N/4 to form a complex signal string $Z_{02}$ as expressed by formula (6) below.

$$z_{02}(k) = \sum_{n=0}^{n/4-1} z_{01}(n)\exp\left(-j\frac{2\pi kn}{N/4}\right), \quad (6)$$
$$\text{for } 0 \leq k \leq \frac{N}{4} - 1$$

Then, from $Z_{02}$ obtained in a manner as described above, four complex signal strings $Z_{03}$, $Z_{04}$, $Z_{05}$ and $Z_{06}$ are formed by using formulas (7) through (10) respectively.

$$z_{03}(k) = \frac{1}{2}\left(z_{02}(k) + z_{02}^*\left(\frac{N}{4} - 1 - k\right)\right), \text{ for } 0 \leq k \leq \frac{N}{4} - 1 \quad (7)$$

$$z_{04}(k) = \frac{1}{2j}\exp\left(-j\frac{2\pi(2k+1)}{N}\right)\left(z_{02}(k) - z_{02}^*\left(\frac{N}{4} - 1 - k\right)\right), \quad (8)$$
$$\text{for } 0 \leq k \leq \frac{N}{4} - 1$$

$$z_{05}(k) = \frac{1}{2}\left(z_{02}\left(\frac{N}{4} - 1 - k\right) + z_{02}^*(k)\right), \text{ for } 0 \leq k \leq \frac{N}{4} - 1 \quad (9)$$

$$z_{06}(k) = \frac{1}{2j}\exp\left(j\frac{2\pi(2k+1)}{N}\right)\left(z_{02}\left(\frac{N}{4} - 1 - k\right) - z_{02}^*(k)\right), \quad (10)$$
$$\text{for } 0 \leq k \leq \frac{N}{4} - 1$$

Thereafter, $y_{01}(k)$ is obtained for a range between 0 and N/2−1 from the above complex signal strings $Z_{03}$, $Z_{04}$, $Z_{05}$ and $Z_{06}$ by using formula (11) below.

$$y_{01}(k) = \operatorname{Re}\left(\exp\left(-j\frac{2\pi(2k+1)}{4N}\right)(z_{03}(k) + z_{04}(k))\right) \quad (11)$$

$$y_{01}(N/2 - 1 - k) = \operatorname{Re}\left(-j\exp\left(j\frac{2\pi(2k+1)}{4N}\right)\right.$$
$$\left.(z_{05}(k) + z_{06}(k))\right),$$
$$\text{for } 0 \leq k \leq \frac{N}{4} - 1$$

As proved in Japanese Patent Application Laid-Open No. 5-183442, this agree with $y_0$ defined by formula (1).

Meanwhile, the IMDCT defining equation is given by formula (12) below.

$$x_1(n) = C_1 f(n) \sum_{k=0}^{N/2-1} y_1(k)\cos\left(\frac{\pi(2k+1)(2n+N/2+1)}{2N}\right), \quad (12)$$
$$\text{for } 0 \leq n \leq N - 1$$

where $y_1$ represents the IMDCT input signal, N represents the block length, f represents the window function for inverse transform, $x_1$ represents the IMDCT output signal, $C_1$ represents a constant, n represents an integer between 0 and N−1 and k represents an integer between 0 and N/2−1. Since the IMDCT processing operation is conducted on a block by block basis for the cut out time series data so as to separate each block, the block number J is omitted from the above formula. Additionally, since the value of $C_1$ essentially does not affect the method used for the IMDCT, $C_1$=1 is assumed here for the sake of convenience.

When carrying out computations with the above formula, firstly $y_1$ is rearranged to form $y_{11}$ by means of formula (13) below.

$$y_{11}(k) = \begin{cases} y_1(2k), & \text{for } 0 \leq k \leq \frac{N}{4} - 2 \\ -y_1(N - 1 - 2k), & \text{for } \frac{N}{4} \leq k \leq \frac{N}{2} - 1 \end{cases} \quad (13)$$

Subsequently, a complex signal string $z_{11}$ having a length of N/4 is formed by using formula (14) below from $y_{11}$.

$$z_{11}(k) = (y_{11}(2k) + jy_{11}(2k+1))\exp\left(-j\frac{2\pi k}{(N/2)}\right), \quad (14)$$
$$\text{for } 0 \leq k \leq \frac{N}{4} - 1$$

The obtained complex signal string $z_{11}$ is subjected to FFT on the basis of a length of N/4 to form a complex signal string $Z_{12}$ as expressed by formula (15) below.

$$z_{12}(n) = \sum_{k=0}^{n/4-1} z_{11}(k)\exp\left(-j\frac{2\pi nk}{(N/4)}\right), \text{ for } 0 \leq n \leq \frac{N}{4} - 1 \quad (15)$$

Then, from $z_{12}$ obtained in a manner as described above, four complex signal strings $z_{13}$, $z_{14}$, $z_{15}$ and $z_{16}$ are formed by using formulas (16) through (19) below respectively.

$$z_{13}(n) = \frac{1}{2}\left(z_{12}(n) + z_{12}^*\left(\frac{N}{4} - 1 - n\right)\right), \text{ for } 0 \leq n \leq \frac{N}{4} - 1 \quad (16)$$

$$z_{14}(n) = \frac{1}{2j}\exp\left(-j\frac{2\pi(2n+1)}{N}\right)\left(z_{12}(n) - z_{12}^*\left(\frac{N}{4} - 1 - n\right)\right), \quad (17)$$
$$\text{for } 0 \leq n \leq \frac{N}{4} - 1$$

$$z_{15}(n) = \frac{1}{2}\left(z_{12}\left(\frac{N}{4} - 1 - n\right) + z_{12}^*(n)\right), \text{ for } 0 \leq n \leq \frac{N}{4} - 1 \quad (18)$$

-continued $$z_{16}(n) = \frac{1}{2j}\exp\left(j\frac{2\pi(2n+1)}{N}\right)\left(z_{12}\left(\frac{N}{4}-1-n\right) - z_{12}^*(n)\right), \quad (19)$$

$$\text{for } 0 \le n \le \frac{N}{4} - 1$$

Thereafter, $x_{11}(n)$ is obtained for a range between 0 and $N/2-1$ from the above complex signal strings $z_{13}$, $z_{14}$, $z_{15}$ and $z_{16}$ by using formula (20) below.

$$x_{11}(n) = \text{Re}\left(\exp\left(-j\frac{2\pi(2n+1)}{N}\right)(z_{13}(n) + z_{14}(n))\right) \quad (20)$$

$$x_{11}\left(\frac{N}{2} - 1 - n\right) = \text{Re}\left(-j\exp\left(j\frac{2\pi(2n+1)}{N}\right)(z_{15}(n) + z_{16}(n))\right),$$

$$\text{for } 0 \le n \le \frac{N}{4} - 1$$

The obtained $x_{11}$ is then subjected to a rearrangement, changing the polarity thereof, and a window for inverse transform is applied thereto to obtain $x_{12}$ as expressed by formula (21) below.

$$x_{12}(n) = \begin{cases} f(n)x_{11}\left(n + \frac{N}{4}\right), & \text{for } 0 \le n \le \frac{N}{4} - 1 \\ -f(n)x_{11}\left(\frac{3N}{4} - 1 - n\right), & \text{for } \frac{N}{4} \le n \le \frac{3N}{4} - 1 \\ -f(n)x_{11}\left(n - \frac{3N}{4}\right), & \text{for } \frac{3N}{4} \le n \le N - 1 \end{cases} \quad (21)$$

As proved in Japanese Patent Application Laid-Open No. 5-183442, this agree with $x_1$ defined by formula (12).

As described above, a linear forward transform for the forward transform computations of MDCT to be conducted on the N samples of the input signal can be realized by means of computations for performing an FFT on a complex signal with a length of N/4. Thus, the volume of computations or the work area for computations can be reduced. On the other hand, a linear inverse transform for inverse transform computations of MDCT to be conducted on the N/2 independent spectrum input signal can be realized by means of computations for performing an FFT on a complex signal with a length of N/4. Thus, the volume of computations or the work area for computations can be reduced.

However, in a device for high efficiency coding/decoding using MDCT and IMDCT, there may be cases where it is desirable to reduce the volume of computations by limiting the frequency band required for decoding particularly when the processing capacity of the device is small.

FIGS. 2A and 2B shows the MDCT and the IMDCT when the frequency band is limited.

Referring to FIG. 2A, when the samples Ta obtained by removing samples Tb to decimate a block of N samples are subjected to an MDCT, N/2 spectrums indicated by Sa and Sb in FIG. 2A are obtained. Furthermore, when the N/4 spectrums of lower order indicated by Sa in FIG. 2A are selected from the above spectrums and subjected to an IMDCT, the sampling frequency is doubled and a time series signal of N/2 samples is obtained.

Thus, the volume of arithmetic operations of FFT is a half of the comparable volume that is required when the frequency band is not limited.

Similarly, as shown in FIG. 2B, when the N/8 spectrums of lower order are selected from the above spectrums and subjected to an IMDCT, the sampling frequency is quadrupled and a time series signal of N/4 samples is obtained. Thus, the volume of arithmetic operations of FFT is a quarter of the comparable volume that is required when the frequency is not limited.

Now, N signals are decimated to produce $N/(2^m)$ signals and a window is applied thereto to obtain $X_{01}$ by using formula (22) below.

$$X_{01}(n) = h(2_n^m)x_0(2_n^m), \text{ for } 0 \le n \le \frac{N}{2^m} - 1 \quad (22)$$

Then, the MDCT is expressed by formula (23) below.

$$Y_{01}(k) = \sum_{n=0}^{N/2^m - 1} X_{01}(n)\cos\left(\frac{\pi(2k+1)(2^{m+1}n + N/2 + 1)}{2N}\right); \quad (23)$$

$$\text{for } 0 \le k \le \frac{N}{2^{m+1}} - 1$$

Subsequently, $X_{01}$ is rearranged by using formula (24) below to form $X_{02}$ in a manner as described in Japanese Patent Application Laid-Open No. 5-183442.

$$X_{02}(n) = \begin{cases} -X_{01}\left(n + \frac{3N}{2^{m+2}}\right), & \text{for } 0 \le n \le \frac{N}{2^{m+2}} - 1 \\ X_{01}\left(n - \frac{N}{2^{m+2}}\right), & \text{for } \frac{N}{2^{m+2}} \le n \le \frac{N}{2^m} - 1 \end{cases} \quad (24)$$

Formula (25) below is obtained, using $X_{02}$ in a manner as described in Japanese Patent Application Laid-Open No.5-183442.

$$Y_{01}(k) = \sum_{n=0}^{N/2^m - 1} X_{02}(n)\cos\left(\frac{\pi(2k+1)(2^{m+1}n + 1)}{2N}\right) \quad (25)$$

$$= \sum_{n=0}^{N/2^{m+1} - 1} X_0(2n)\cos$$

$$\left(\frac{\pi(2k+1)(2^{m+2}n + 1)}{2N}\right) + \sum_{n=0}^{N/2^{m+1} - 1} X_{02}$$

$$(2n+1)\cos\left(\frac{\pi(2k+1)(2^{m+1}(2n+1)+1)}{2N}\right)$$

$$= \sum_{n=0}^{N/2^{m+1} - 1} X_{02}(2n)\cos$$

$$\left(\frac{\pi(2k+1)(2^{m+2}n + 1)}{2N}\right) - \sum_{n=0}^{N/2^{m+1} - 1}$$

$$X_{02}\left(\frac{N}{2^m} - 2n - 1\right)\cos$$

$$\left(\frac{\pi(2k+1)(-2^{m+2}n - 2^{m+1} + 1)}{2N}\right)$$

$$= \text{Re}\left\{\sum_{n=0}^{N/2^{m+1} - 1} (X_{02}(2n)\exp\right.$$

-continued $$\left(-j\frac{\pi(2k+1)}{2N}\right)\right\} - X_{02}\left(\frac{N}{2^m} - 2n - 1\right)$$

$$\exp\left(-j\frac{\pi(2k+1)(2^{m+1}-1)}{2N}\right)\exp$$

$$\left(-j\frac{\pi(2k+1)n}{N/2^{m+1}}\right)\}, \text{ for } 0 \leq n \leq \frac{N}{2^{m+1}} - 1$$

If $Z_{01}$ is expressed by formula (26) below, it then can also be expressed by formula (27).

$$Z_{01}(n) = X_{02}(2n)\exp\left(-j\frac{\pi(2k+1)}{2N}\right) - X_{02}(N/2^m - 1 - 2n) \quad (26)$$

$$\exp\left(-j\frac{\pi(2k+1)(2^{m+1}-1)}{2N}\right),$$

for $0 \leq n \leq \frac{N}{2^{m+1}} - 1$ $$Z_{02}(n) = \text{Re}\left(\sum_{n=0}^{N/2^{m+1}-1} z_{01}(n)\exp\left(-j\frac{\pi(2k+1)n}{N/2^m}\right)\right), \quad (27)$$

for $0 \leq k \leq \frac{N}{2^{m+1}} - 1$

However, since $Z_{01}$ of the above instance is a complex number unlike the case of Japanese Patent Application Laid-Open No. 5-183442, there is not established a relationship where the sum and the difference of an even number and an odd number for n become complex conjugates. Then, as a result, it is not possible to perform computations for an FFT of the size of $N/(2^{\wedge}(m+2))$. In other words, the volume of arithmetic operations is similar to the comparable volume that is required when the frequency band is not limited in terms of number of multiplications and number of additions.

BRIEF SUMMARY OF THE INVENTION

In view of the above described circumstances, it is therefore the object of the present invention to provides a signal processing device and a signal processing method for performing forward transform computations and inverse transform computations of MDCT at high speed for the purpose of realizing a linear transform of various digital signals such as audio signal and video signals and also performing a code string transform from a coding system into another, wherein the arithmetic operations of MDCT and those of IMDCT with a limited band are carried out at high speed by performing computations using an FFT with a short tap length as compared with a case where the band is not limited so as to reduce the work area and realize a higher speed for the arithmetic operations, whereas reducing the volume of computations such as multiplications or additions.

According to the invention, the above object is achieved by providing a signal processing device adapted to multiply the $N/(2^{\wedge}m)$ samples obtained by decimating the N samples of a signal by a forward transform window and subsequently perform a linear forward transform on the obtained signal, said device comprising:

a preprocessing means for performing a predetermined preprocessing operation on the signal obtained by the multiplication using the multiplier of said forward transform window;

a transform processing means for performing a processing operation equivalent to a fast Fourier transform on the output signal of said preprocessing means; and a postprocessing means for performing a predetermined postprocessing operation on the output signal of said transform processing means;

the input signal and the output signal of said transform processing means being complex signals having a length of $N/(2^{\wedge}(m+2))$.

In another aspect of the invention, there is also provided a signal processing device adapted to perform a linear inverse transform on a signal band-limited to $N/2^{\wedge}(m+1)$ samples out of N/2 samples and multiply the signal obtained by the linear inverse transform by an inverse transform window to produce $N/2^{\wedge}(m+1)$ independent signals, said-device comprising;

a preprocessing means for performing a predetermined preprocessing operation on the said band-limited signal;

a transform processing means for performing a processing operation equivalent to a fast Fourier transform on the output signal of said preprocessing means; and a postprocessing means for performing a predetermined postprocessing operation on the output signal of said transform processing means;

the input signal and the output signals of said transform processing means being complex signals having a length of $N/(2^{\wedge}(m+2))$.

In still another aspect of the invention, there is provided a signal processing device comprising:

a first transform means for decoding the first code string produced by coding the spectrum signal obtained by performing a direct modified discrete cosine transform on a time series signal and transforming the spectrum signal obtained by the decoding into a time series signal by performing an inverse modified discrete cosine transform; and a second transform means for transforming the, time series signal output from said first transform means into a spectrum signal by performing a direct modified discrete cosine transform and coding the spectrum signal into a second code string;

upon being allowed to make the signal band of said second code string narrower than that of said first code string, said first transform means performing the computations of the fast Fourier transform to be carried out for said inverse modified discrete cosine transform, using a tap length corresponding to said narrowed band.

In still another aspect of the invention, there is provided a signal processing device comprising:

a first transform means for decoding the first code string produced by coding the spectrum signals obtained by performing a direct modified discrete cosine transform on each of the signals obtained by dividing a time series signal into a plurality of bands, transforming the spectrum signals obtained by the, decoding into time series signals by performing an inverse modified discrete cosine transform and synthetically combining the bands; and a second transform means for transforming the time series signal output from said first transform means into a spectrum signal by performing a direct modified discrete cosine transform and coding the spectrum signal into a second code string;

upon being allowed to make specific ones of said signal bands of said second code string narrower than the corresponding ones of the signal bands of said first code string, said first transform means performing the computations of the fast Fourier transform to be carried out for said inverse modified discrete cosine transform, using a tap length corresponding to said narrowed bands.

In still another aspect of the invention, there is provided a signal processing device comprising:

a first transform means for decoding the first code string produced by coding the spectrum signal obtained by performing a direct modified discrete cosine transform on a time series signal and transforming the spectrum signal obtained by the decoding into a time series signal by performing an inverse modified discrete cosine transform; and a second transform means for transforming the time series signal output from said first transform means into a spectrum signal by performing a direct modified discrete cosine transform and coding the spectrum signal into a second code string;

upon being allowed to make the signal band of said second code string narrower than that of said first code string, said second transform means performing the computations of the fast Fourier transform to be carried out for said direct modified discrete cosine transform, using a tap length corresponding to said narrowed band.

In still another aspect of the invention, there is provided a signal processing device comprising:

a first transform, means for decoding the first code string produced by coding the spectrum signals obtained by performing a direct modified discrete cosine transform on each of the signals obtained by dividing a time series signal into a plurality of bands, transforming the spectrum signals obtained by the decoding into time series signals by performing an inverse modified discrete cosine transform and synthetically combining the bands; and a second transform means for transforming the time series signal output from said first transform means into a spectrum signal by performing a direct modified discrete cosine transform and coding the spectrum signal into a second code string;

upon being allowed to make specific ones of said signal bands of said second code string narrower than the corresponding ones of the signal bands of said first code string, said second transform means performing the computations of the fast Fourier transform to be carried out for said direct modified discrete cosine transform, using a tap length corresponding to said narrowed bands.

In still another aspect of invention, the above object is achieved by providing a signal processing method adapted to multiply the $N/(2^m)$ samples obtained by decimating the N samples of a signal by a forward transform window and subsequently perform a linear forward transform on the obtained signal, said method comprising:

a preprocessing step of performing a predetermined preprocessing operation on the signal obtained by the multiplication using the multiplier of said forward transform window;

a transform processing step of performing a processing operation equivalent to a fast Fourier transform on the output signal of said preprocessing step; and a postprocessing step of performing a predetermined postprocessing operation on the output signal of said transform processing step;

the input signal and the output signal of said transform processing step being complex signals having a length of $N/(2^{(m+2)})$.

In still another aspect of the invention, there is also provided a signal processing method adapted to perform a linear inverse transform on a signal band-limited to $N/2^{(m+1)}$ samples out of N/2 samples and multiply the signal obtained by the linear inverse transform by an inverse transform window to produce $N/2^{(m+1)}$ independent signals, said method comprising;

a preprocessing step of performing a predetermined preprocessing operation on the said band-limited signal;

a transform processing step of performing a processing operation equivalent to a fast Fourier transform on the output signal of said preprocessing step; and a postprocessing step of performing a predetermined postprocessing operation on the output signal of said transform processing step;

the input signal and the output signals of said transform processing step being complex signals having a length of $N/(2^{(m+2)})$.

In still another aspect of the invention, there is provided a signal processing method comprising:

a first transform step of decoding the first code string produced by coding the spectrum signal obtained by performing a direct modified discrete cosine transform on a time series signal and transforming the spectrum signal obtained by the decoding into a time series signal by performing an inverse modified discrete cosine transform; and a second transform step of transforming the time series signal output from said first transform step into a spectrum signal by performing a direct modified discrete cosine transform and coding the spectrum signal into a second code string;

upon being allowed to make the signal band of said second code string narrower than that of said first code string, the computations of the fast Fourier transform to be carried out for said inverse modified discrete cosine transform being performed in said first transform step, using a tap length corresponding to said narrowed band.

In still another aspect of the invention, there is provided a signal processing method comprising:

a first transform step of decoding the first code string produced by coding the spectrum signals obtained by performing a direct modified discrete cosine transform on each of the signals obtained by dividing a time series signal into a plurality of bands, transforming the spectrum signals obtained by the decoding into time series signals by performing an inverse modified discrete cosine transform and synthetically combining the bands; and a second transform step of transforming the time series signal output from said first transform step into a spectrum signal by performing a direct modified discrete cosine transform and coding the spectrum signal into a second code string;

upon being allowed to make specific ones of said signal bands of said second code string narrower than the corresponding ones of the signal bands of said first code string, the computations of the fast Fourier transform to be carried out for said inverse modified discrete cosine transform being performed in said first transform step, using a tap length corresponding to said narrowed bands.

In still another aspect of the invention, there is provided a signal processing method comprising:

a first transform step of decoding the first code string produced by coding the spectrum signal obtained by performing a direct modified discrete cosine transform on a time series signal and transforming the spectrum signal obtained by the decoding into a time series signal by performing an inverse modified discrete cosine transform; and a second transform step of transforming the time series signal output from said first transform step into a spectrum signal by performing a direct modified discrete cosine transform and coding the spectrum signal into a second code string;

upon being allowed to make the signal band of said second code string narrower than that of said first code string, the computations of the fast Fourier transform to be carried out for said direct modified discrete cosine transform being performed in said second transform step, using a tap length corresponding to said narrowed band.

In still another aspect of the invention, there is provided a signal processing method comprising:

a first transform step of decoding the first code string produced by coding the spectrum signals obtained by performing a direct modified discrete cosine transform on each of the signals obtained by dividing a time series signal into a plurality of bands, transforming the spectrum signals obtained by the decoding into time series signals by performing an inverse modified discrete cosine transform and synthetically combining the bands; and a second transform step of transforming the time series signal output from said first transform step into a spectrum signal by performing a direct modified discrete cosine transform and coding the spectrum signal into a second code string;

upon being allowed to make specific ones of said signal bands of said second code string narrower than the corresponding ones of the signal bands of said first code string, the computations of the fast Fourier transform to be carried out for said direct modified discrete cosine transform being performed in said second transform step, using a tap length corresponding to said narrowed bands.

Thus, according to the invention, a linear forward transform can be realized for the purpose of a modified DCT to be carried out on $N/2^{(m)}$ samples by way of computations for performing an FFT on a complex signal having a length of $N/(2^{(m+2)})$ to consequently reduce the volume of computations and the work area required for the computations. Likewise, a linear inverse transform can be realized for the purpose of a modified DCT to be carried out on $N/2^{(m)}$ independent spectrum input signals by way of computations for performing an FFT on a complex signal having a length of $N/(2^{(m+2)})$ to consequently reduce the volume of computations and the work area required for the computations. Additionally, when converting a code encoded by a coding system into a code of the other system of two different coding systems using a modified DCT and the band of the original code may be narrowed, the size of the FFT for the inverse transform process of the modified DCT can be reduced from the ordinary size to realize a high speed transform operation. Likewise, when converting a code encoded by a coding system into a code of the other system of two different coding systems using a modified DCT and the band of the converted code maybe narrowed, the size of the FFT for the forward transform process of the modified DCT can be reduced from the ordinary size to realize a high speed transform operation.

Then, according to the invention, when using the modified discrete cosine transform for transforming a time series signal into a spectrum signal, the size of the fast Fourier transform is reduced from the normal size depending on the required band. Similarly, when converting a code encoded by a coding system into a code of the other system of two different coding systems using a modified discrete cosine transform, the volume of computations necessary for modified discrete cosine transform is reduced from the normal volume (required when the band is limited but the volume of computations of the MDCT and that of the IMDCT are not limited) depending on the required band. As a result, the volume of arithmetic operations including the number of multiplications and that of additions can be reduced to by turn reduce the work area required for the computations and realize a high speed transform operation.

More specifically, according to the invention, for producing. N/2 spectrum data obtained by directly performing a modified DCT (MDCT) on N time series sample data cut out so as to make each of the blocks overlap the rear half (50%) of the preceding block and the front half (50%) of the succeeding block, the computations of direct MDCT can be performed efficiently by using an FFT with a length of $N/(2^{(m+2)})$ if the required number of spectrums is $N/(2^{(m+1)})$ after the transform so that the volume of computations can be reduced depending on the capacity of the coding device being used and the quality of the codes involved. Then, as a result, it is possible to provide an encoder and a code string transform device having a simple configuration and operating efficiently for audio signals.

Additionally, according to the invention, for producing N time series sample data by inversely performing a modified DCT (MDCT) on N/2 independent spectrums, the computations of inverse MDCT can be performed efficiently by using an FFT with a length of $N/(2^{(m+2)})$ if the required number of spectrums is $N/(2^{(m+1)})$ before the transform so that the volume of computations can be reduced depending on the capacity of the coding device being used and the quality of the codes involved. Then, as a result, it is possible to provide a decoder and a code string transform device having a simple configuration and operating efficiently for audio signals.

Still additionally, according to the invention, when converting a code string encoded by a coding system into a code string of the other-system of two different coding systems using a modified discrete cosine transform, each of the systems being adapted to transform a time series signal into a spectrum signal and then code and decode the obtained spectrum signal by means of a device for directly performing an MDCT and subsequently transforming the spectrum signal into a time series signal by means of a device for inversely performing an MDCT, if an operation of restoring the time series signal by means of a device for inversely performing a modified DCT and subsequently transforming it into a spectrum signal by means of a device for directly performing a modified DCT can be carried out by using a narrow band after the transform, the size of the fast Fourier transform by the device for inversely performing a MDCT is reduced from the normal size to realize a high speed transform operation.

Still additionally, according to the invention, when converting a code string encoded by a coding system into a code string of the other system of two different coding systems using a modified discrete cosine transform, each of the systems being adapted to divide a time series signal by means of a sub-band filter, transform the signal of each of the bands obtained by the division into a spectrum signal and then code and decode the obtained spectrum signal by means of a device for directly performing an MDCT and subsequently transforming the spectrum signal into a time series signal by means of a device for inversely performing an MDCT, if an operation of restoring the time series signal by means of a device for inversely performing a modified discrete cosine transform and subsequently transforming it into a spectrum signal by means of a device for directly performing a modified discrete cosine transform can be carried out by using specific narrow bands after the division, the size of the fast Fourier transform by the device for inversely performing a MDCT is reduced from the normal size to realize a high speed transform operation.

Furthermore, according to the invention, when converting a code string encoded by a coding system into a code string of the other system of two different coding systems using a modified discrete cosine transform, each of the systems being adapted to transform a time series signal into a spectrum signal and then code and decode the obtained spectrum signal by means of a device for directly performing an MDCT and subsequently transforming the spectrum signal into a time series signal by means of a device for inversely performing an MDCT, if an operation of restoring the time series signal by means of a device for inversely performing a MDCT and subsequently transforming it into a spectrum signal by means of a device for directly performing a MDCT can be carried out by using a narrow band before the transform, the size of the fast Fourier transform by the device for inversely performing a MDCT is reduced from the normal size to realize a high speed transform operation.

Finally, according to the invention, when converting a code string encoded by a coding system into a code string of the other system of two different coding systems using a modified discrete cosine transform, each of the systems being adapted to divide a time series signal by means of a sub-band filter, transform the signal of each of the bands obtained by the division into a spectrum signal and then code and decode the obtained spectrum signal by means of a device for directly performing an MDCT and subsequently transforming the spectrum signal into a time series signal by means of a device for inversely performing an MDCT, if an operation of restoring the time series signal by means of a device for inversely performing a modified discrete cosine transform and subsequently transforming it into a spectrum signal by means of a device for directly performing a modified discrete cosine transform can be carried out by using specific narrow bands before the division, the size of the fast Fourier transform by the device for directly performing a MDCT is reduced from the normal size to realize a high speed transform operation.

BRIEF DESCRIPTION OF THE SEVERAL VIEWS OF THE DRAWING

FIGS. 2A and 2B are schematic illustrations of input signals and output signals of MDCT and IMDCT;

DETAILED DESCRIPTION OF THE INVENTION

Figure 1:
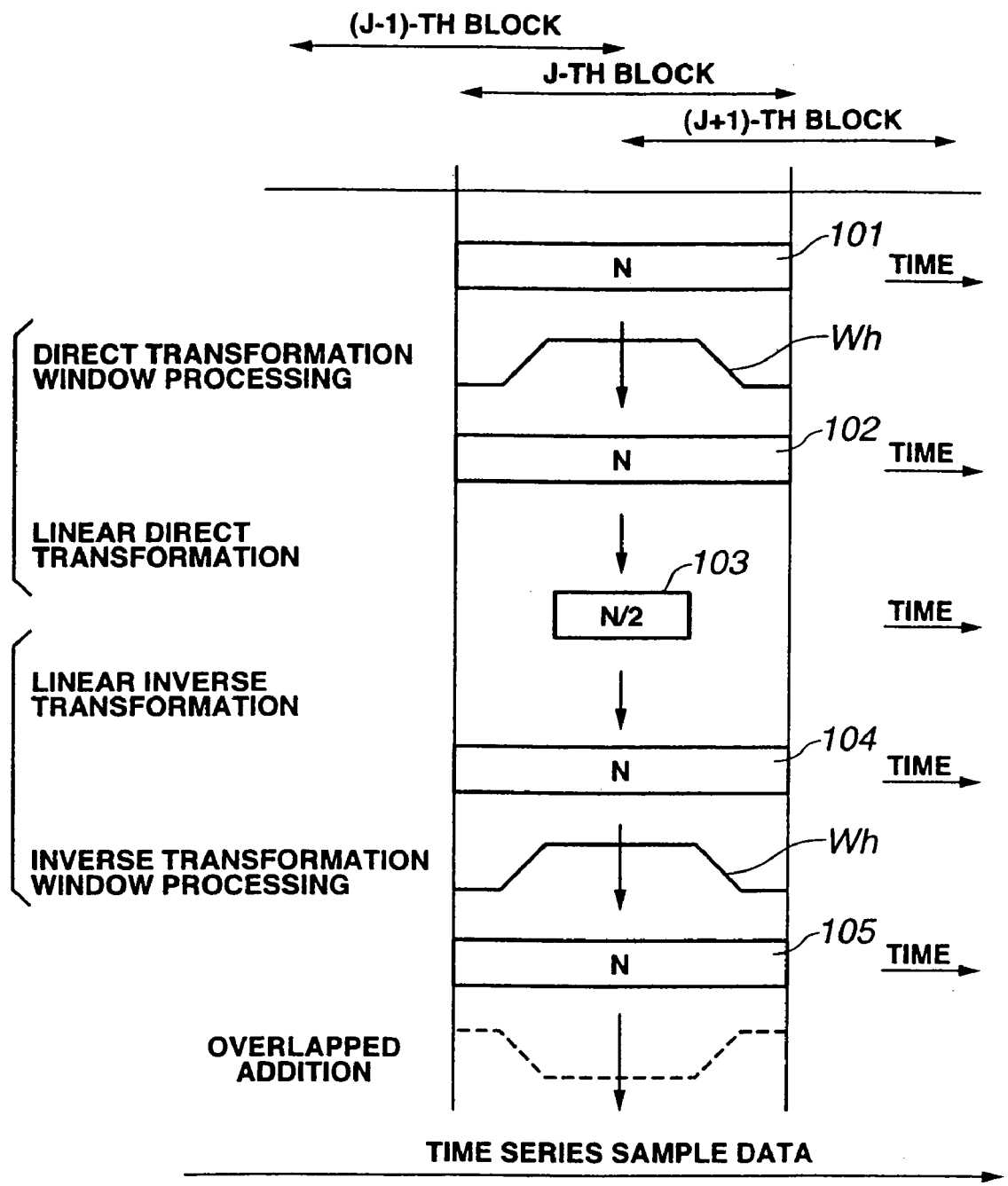
FIG. 1 is a schematic illustration of the processing sequence of MDCT and inverse IMDCT.

Now, the present invention will be described in greater detail by referring to the accompanying drawing that illustrate preferred embodiments of the invention.

Firstly, the principle of computations that is adopted to the present invention will be discussed before describing specific embodiments of signal processing device and signal processing method according to the invention.

When performing computations of MDCT (modified DCT) with a signal processing device and a signal processing method according to the invention, formula (28) below is used to extract $N/(2^m)$ samples corresponding to $2^m(n+\frac{1}{2})-\frac{1}{2}$ positions out of the time series sample data that are divided into blocks, each comprising N samples.

$$Y_{21}(k) = \sum_{n=0}^{N/2^m-1} X_{21}\left(2^m\left(n+\frac{1}{2}\right)-\frac{1}{2}\right) \cos\left(\frac{\pi(2k+1)(2^{m+1}n+N/2+2^m)}{2N}\right),$$ (28)

$$\text{for } 0 \le k \le \frac{N}{2^{m+1}} - 1$$

Then, the input signals $X_{21}$ are multiplied by window $H_{21}$ to produce $X_{22}$, using formula (29) below.

$$X_{22}(n) = H_{21}\left(2^m\left(n+\frac{1}{2}\right)-\frac{1}{2}\right)X_{21}\left(2^m\left(n+\frac{1}{2}\right)-\frac{1}{2}\right)$$ (29)

Then, $X_{22}$ are rearranged by using formula (30) below to produce $X_{23}$.

$$X_{23}(n) = \begin{cases} -X_{22}\left(n+\frac{3N}{2^{m+2}}\right), & \text{for } 0 \le n \le \frac{N}{2^{m+2}}-1 \\ X_{22}\left(n-\frac{N}{2^{m+2}}\right), & \text{for } \frac{N}{2^{m+2}} \le n \le \frac{N}{2^m}-1 \end{cases}$$ (30)

Then $X_{24}$ are formed through formula (31) by using $X_{23}$ obtained by formula (30).

$$X_{24}(n) = X_{23}(2n) - X_{23}\left(\frac{N}{2^m}-1-2n\right), \text{ for } 0 \le n \le \frac{N}{2^{m+1}}-1$$ (31)

Furthermore, $N/(2^{\wedge}(m+2))$ complex signals $Z_{21}$ are obtained by using $X_{24}$ and formula (32) below.

$$Z_{21}(n) = (X_{24}(2n) + jX_{24}(2n+1))\exp\left(-j\frac{2\pi n}{(n/2)}\right),$$ (32)

$$\text{for } 0 \le n \le \frac{N}{2^{m+2}} - 1$$

Thereafter, $N/(2^{\wedge}(m+2))$ complex signals $Z_{22}$ are obtained by using formula (33) below.

$$Z_{22}(k) = \sum_{n=0}^{N/2^{m+2}-1} Z_{21}(n)\exp\left(-j\frac{2\pi kn}{(N/2^{m+2})}\right),$$ (33)

$$\text{for } 0 \le k \le \frac{N}{2^{m+2}} - 1$$

Then, complex signals $Z_{23}$, $Z_{24}$, $Z_{25}$ and $Z_{26}$ having a length of $N/(2^{\wedge}(m+2))$ are obtained by computations using formulas (34) through (37) respectively.

$$Z_{23}(k) = \frac{1}{2}\left(Z_{22}(k) + Z_{22}^*\left(\frac{N}{2^{m+2}}-1-k\right)\right),$$ (34)

$$\text{for } 0 \le k \le \frac{N}{2^{m+2}} - 1$$

-continued $$Z_{24}(k) = \frac{1}{2j}\exp\left(-j\frac{2\pi(2k+1)}{N/2^m}\right)\left(Z_{22}(k) - Z_{22}^*\left(\frac{N}{2^{m+2}}-1-k\right)\right),$$ (35)

$$\text{for } 0 \le k \le \frac{N}{2^{m+2}} - 1$$

$$Z_{25}(k) = \frac{1}{2}\left(Z_{22}\left(\frac{N}{2^{m+2}}-1-k\right) + Z_{22}^*(k)\right),$$ (36)

$$\text{for } 0 \le k \le \frac{N}{2^{m+2}} - 1$$

$$Z_{26}(k) = \frac{1}{2j}\exp\left(j\frac{2\pi(2k+1)}{N/2^m}\right)\left(Z_{22}\left(\frac{N}{2^{m+2}}-1-k\right) - Z_{22}^*(k)\right),$$ (37)

$$\text{for } 0 \le k \le \frac{N}{2^{m+2}} - 1$$

Then, $Y_{21}$ having the length of $N/(2^{\wedge}(m+1))$ are obtained from the complex signals $Z_{23}$, $Z_{24}$, $Z_{25}$ and $Z_{26}$ by using formula (38) below.

$$Y_{21}(k) = \text{Re}\left(\exp\left(-j\frac{2\pi(2k+1)}{4(N/2^m)}\right)(Z_{23}(k)+Z_{24}(k))\right)$$ (38)

$$Y_{21}\left(\frac{N}{2^{m+1}}-1-k\right) = \text{Re}\left(-j\exp\left(j\frac{2\pi(2k+1)}{4(N/2^m)}\right)(Z_{25}(k)+Z_{26}(k))\right), \text{ for } 0 \le k \le \frac{N}{2^{m+2}}-1$$

It will be appreciated that the above result of formula (38) agree with $Y_{21}$ of formula (28) above, as follows.

Then, formula (28) is substituted by formula (29) and transformed in a manner as expressed by formula (39) below.

$$Y_{21}(k) = \sum_{n=0}^{N/2^m-1} X_{22}(n)\cos\left(\frac{\pi(2k+1)(2^{m+1}n+N/2+2^m)}{2N}\right),$$ (39)

$$\text{for } 0 \le k \le \frac{N}{2^{m+1}} - 1$$

$$= \sum_{n=N/2^{m+2}}^{5N/2^{m+2}-1} X_{22}(n-N/2^{m+2})\cos\left(\frac{\pi(2k+1)\left(2^{m+1}\left(n-\frac{N}{2^{m+2}}\right)+N/2+2^m\right)}{2N}\right)$$

$$= \sum_{n=N/2^{m+2}}^{N/2^m-1} X_{22}(n-N/2^{m+2})\cos\left(\frac{\pi(2k+1)(2^{m+1}n+2^m)}{2N}\right) +$$

$$\sum_{n=N/2^m}^{5N/2^{m+1}-1} X_{22}(n-N/2^{m+2})\cos\left(\frac{\pi(2k+1)(2^{m+1}n+2^m)}{2N}\right)$$

$$= \sum_{n=N/2^{m+2}}^{N/2^m-1} X_{22}(n-N/2^{m+2})\cos$$

-continued $$\left(\frac{\pi(2k+1)(2^{m+1}n+2^m)}{2N}\right)+$$

$$\sum_{n=0}^{N/2^{m+2}-1} X_{22}(n+3N/2^{m+2})\cos$$

$$\left(\frac{\pi(2k+1)\left(2^{m+1}\left(n+\frac{N}{2^m}\right)+2^m\right)}{2N}\right)$$

$$=\sum_{n=N/2^{m+2}}^{N/2^m-1} X_{22}(n-N/2^{m+2})\cos$$

$$\left(\frac{\pi(2k+1)(2^{m+1}n+2^m)}{2N}\right)-$$

$$\sum_{n=0}^{N/2^{m+2}-1} X_{22}(n+3N/2^{m+2})\cos$$

$$\left(\frac{\pi(2k+1)(2^{m+1}n+2^m)}{2N}\right)$$

As a result, $X_{23}$ can be obtained by using formula (40) below.

$$X_{23}(n)=\begin{cases}-X_{22}\left(n+\frac{3N}{2^{m+2}}\right), & \text{for } 0\le n\le\frac{N}{2^{m+2}}-1\\ X_{22}\left(n-\frac{N}{2^{m+2}}\right), & \text{for } \frac{N}{2^{m+2}}\le n\le\frac{N}{2^m}-1\end{cases} \quad (40)$$

Then, formula (39) is substituted by formula (40) and transformed in a manner as expressed by formula (41) below.

$$Y_{21}(k)=\sum_{n=0}^{N/2^m-1} X_{23}(n)\cos\left(\frac{\pi(2k+1)(2^{m+1}n+2^m)}{2N}\right) \quad (41)$$

$$=\sum_{n=0}^{N/2^{m+1}-1} X_{23}(2n)\cos\left(\frac{\pi(2k+1)(2^{m+2}n+2^m)}{2N}\right)+$$

$$\sum_{n=0}^{N/2^{m+1}-1} X_{23}(2n+1)\cos$$

$$\left(\frac{\pi(2k+1)(2^{m+1}(2n+1)+2^m)}{2N}\right)$$

$$=\sum_{n=0}^{N/2^{m+1}-1} X_{23}(2n)\cos\left(\frac{\pi(2k+1)(2^{m+2}n+2^m)}{2N}\right)+$$

$$\sum_{n=0}^{N/2^{m+1}-1} X_{23}\left(\frac{N}{2^m}-1-2n\right)\cos$$

$$\left(\frac{\pi(2k+1)(2N-2^{m+2}n-2^m)}{2N}\right)$$

$$=\sum_{n=0}^{N/2^{m+1}-1} X_{23}(2n)\cos$$

$$\left(\frac{\pi(2k+1)(-2^{m+2}n+2^m)}{2N}\right)-$$

$$\sum_{n=0}^{N/2^{m+1}-1} X_{23}\left(\frac{N}{2^m}-1-2n\right)\cos$$

$$\left(\frac{\pi(2k+1)(-2^{m+2}n-2^m)}{2N}\right)$$

$$=\sum_{n=0}^{N/2^{m+1}-1}\left(X_{23}(2n)-X_{23}\left(\frac{N}{2^m}-1-2n\right)\right)\cos$$

$$\left(\frac{\pi(2k+1)(2^{m+2}n+2^m)}{2N}\right)$$

Now, $X_{24}$ is defined by formula (42) below.

$$X_{24}(n)=X_{23}(2n)-X_{23}\left(\frac{N}{2^m}-1-2n\right), \text{ for } 0\le n\le\frac{N}{2^{m+1}}-1 \quad (42)$$

Then, formula (41) is substituted by formula (42) and transformed in a manner as expressed by formula (43) below.

$$Y_{21}(k)=\sum_{n=0}^{N/2^{m+1}-1} X_{24}(n)\cos\left(\frac{\pi(2k+1)(2^{m+2}n+2^m)}{2N}\right) \quad (43)$$

$$=\sum_{n=0}^{N/2^{m+1}-1} X_{24}(n)\cos\left(\frac{\pi(2k+1)(4n+1)}{2N/2^m}\right), \text{ for}$$

$$0\le k\le\frac{N}{2^{m+1}}-1$$

Formula (44) below is obtained by substituting formula (1) by formulas (2) through (4).

$$y_0(k)=\sum_{n=0}^{N/2-1} x_{03}(n)\cos\left(\frac{\pi(2k+1)(4n+1)}{2N}\right), \text{ for} \quad (44)$$

$$0\le k\le\frac{N}{2}-1$$

It will be appreciated that, by comparing formula (43) and formula (44), the latter formula (44) is obtained by replacing N/(2^m) in formula (43) by N.

Therefore, the computation of formula (28) can be realized by carrying out the computations of formula (29) through (38) to perform an FFT with a tap length of N/(2^(m+2)).

The range of values that m can take is defined by formula (45) below.

$$\begin{cases} 0\le m\le\log_2 N-2\\ N\ge 4\end{cases} \quad (45)$$

Figure 3B:
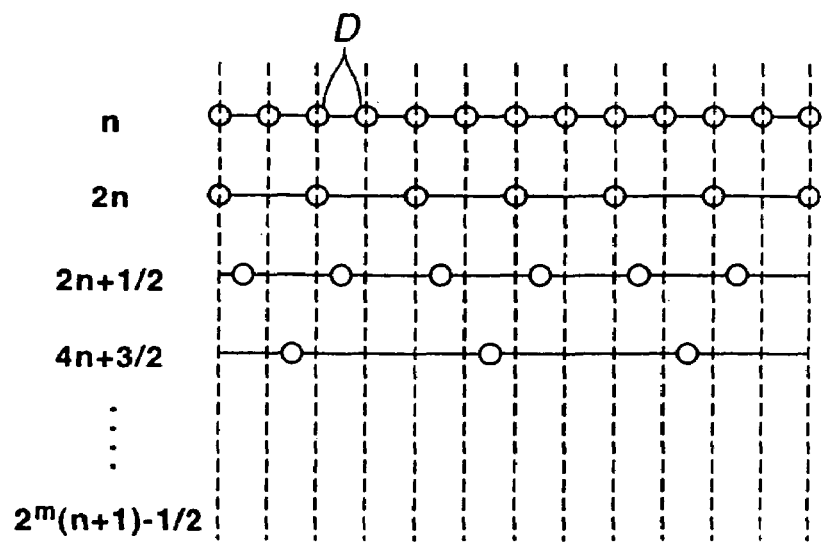
FIG. 3 is a schematic illustration of the positions of time series samples that are used for input/output signals of a device according to the invention.

If m is equal to 0, the above operation is that of an ordinary MDCT without limiting the band. FIG. 3 is a schematic illustration of the positions of time series samples that are used for input/output signals of a device according to the invention. More specifically, in FIG. 3, (a) shows the positions of time series sample data when m is equal to 0 and (b) shows the positions of time series sample data when m is equal to 1, whereas (c) shows the positions of time series sample data when m is equal to 2 and (d) shows the positions of time series sample data D when in is equal to 3.

The computations of IMDCT to be carried out according to the invention by extracting $N/(2^m)$ spectrum data of lower order (or upper order or in the middle of the band) from a total of $N/2$ spectrum data can be realized by using formula (46) below.

$$X_{31}\left(2^m\left(n+\frac{1}{2}\right)-\frac{1}{2}\right) = F_{31}\left(2^m\left(n+\frac{1}{2}\right)-\frac{1}{2}\right) \qquad (46)$$

$$\sum_{k=0}^{N/2^{m+1}-1} Y_{31}\cos\left(\frac{\pi(2k+1)\left(2^{m+1}n+\frac{N}{2}+2^m\right)}{2N}\right),$$

$$\text{for } 0 \le n \le \frac{N}{2^m}-1$$

Then, a total of $N/(2^{(m+1)})$ time series sample data $Y_{32}$ are produced by using formula (47) below on the basis of the input signals $Y_{31}$.

$$Y_{32}(k) = \begin{cases} Y_{31}(2k), & \text{for } 0 \le k \le \frac{N}{2^{m+2}}-1 \\ -Y_{31}\left(\frac{N}{2^m-1-2k}\right), & \text{for } \frac{N}{2^{m+2}} \le k \le \frac{N}{2^{m+1}}-1 \end{cases} \qquad (47)$$

Thereafter, a total of $N/(2^{(m+2)})$ complex signals $Z_3$, are obtained by using formula (48) below on the basis of $Y_{32}$ obtained by means of formula (47) above.

$$Z_{31}(k) = (Y_{32}(2k) + jY_{32}(2k+1))\exp\left(-j\frac{2\pi k}{(N/2^{m+1})}\right), \qquad (48)$$

$$\text{for } 0 \le k \le \frac{N}{2^{m+2}}-1$$

Furthermore, a total of $N/(2^{(m+2)})$ complex signals $Z_{32}$ are obtained by using formula (49) below on the basis of the obtained $Z_{31}$.

$$Z_{32}(n) = \sum_{k=0}^{N/2^{m+2}-1} Z_{31}(k)\exp\left(-j\frac{2\pi k}{(N/2^{m+2})}\right), \qquad (49)$$

$$\text{for } 0 \le k \le \frac{N}{2^{m+2}}-1$$

Then, a string of complex signals $Z_{33}$, $Z_{34}$, $Z_{35}$ and $Z_{36}$, each having a length of $N/(2^{(m+2)})$, are obtained by computing respective formulas (50) through (53) below performed on the basis of the complex signals $Z_{32}$.

$$Z_{33}(n) = \frac{1}{2}\left(Z_{32}(n) + Z_{32}^*\left(\frac{N}{2^{m+2}}-1-n\right)\right), \qquad (50)$$

$$\text{for } 0 \le n \le \frac{N}{2^{m+2}}-1$$

$$Z_{34}(n) = \frac{1}{2j}\exp\left(-j\frac{2\pi(2n+1)}{N/2^m}\right) \qquad (51)$$

$$\left(Z_{32}(n) - Z_{32}^*\left(\frac{N}{2^{m+2}}-1-n\right)\right),$$

$$\text{for } 0 \le n \le \frac{N}{2^{m+2}}-1$$

$$Z_{35}(n) = \frac{1}{2}\left(Z_{32}\left(\frac{N}{2^{m+2}}-1-n\right) + Z_{32}^*(n)\right), \qquad (52)$$

$$\text{for } 0 \le n \le \frac{N}{2^{m+2}}-1$$

$$Z_{36}(n) = \frac{1}{2j}\exp\left(-j\frac{2\pi(2n+1)}{N/2^m}\right) \qquad (53)$$

$$\left(Z_{32}\left(\frac{N}{2^{m+2}}-1-n\right) - Z_{32}^*(n)\right),$$

$$\text{for } 0 \le n \le \frac{N}{2^{m+2}}-1$$

Then, $N/(2^{(m+1)})$ complex signals $X_{33}$ are obtained from the complex signals $Z_{33}$, $Z_{34}$, $Z_{35}$ and $Z_{36}$ by using formula (54) below.

$$X_{33}(n) = \text{Re}\left(\exp\left(-j\frac{2\pi(2n+1)}{N/2^m}\right)(Z_{33}(n) + Z_{34}(n))\right), \qquad (54)$$

$$X_{33}\left(\frac{N}{2^{m+1}}-1-n\right) = \text{Re}\left(-j\exp\left(j\frac{2\pi(2n+1)}{N/2^m}\right)(Z_{35}(n) + Z_{36}(n))\right),$$

$$\text{for } 0 \le n \le \frac{N}{2m+2}-1$$

Then, $X_{32}$ are produced by rearranging the obtained complex signals $X_{33}$, changing the polarity thereof according to formula (55) below.

$$X_{32}(n) = \begin{cases} X_{33}\left(n+\frac{N}{2^{m+2}}\right), & \text{for } 0 \le n \le \frac{N}{2^{m+2}}-1 \\ -X_{33}\left(\frac{3N}{2^{m+2}}-1-n\right), & \text{for } \frac{N}{2^{m+2}} \le n \le \frac{3N}{2^{m+2}}-1 \\ -X_{33}\left(n-\frac{3N}{2^{m+2}}\right), & \text{for } \frac{3N}{2^{m+2}} \le n \le \frac{N}{2^m}-1 \end{cases} \qquad (55)$$

It will be appreciated that the above result agree with that of formula (46), as follows. Firstly $X_{32}$ is defined by formula (56) below.

$$X_{31}\left(2^m\left(n+\frac{1}{2}\right)-\frac{1}{2}\right) = F_{31}\left(2^m\left(n+\frac{1}{2}\right)-\frac{1}{2}\right)X_{34}(n), \qquad (56)$$

$$\text{for } 0 \le n \le \frac{N}{2^m}-1$$

Then, formula (56) is substituted by formula (46) to obtain formula (57) below.

$$X_{34}(n) = \sum_{k=0}^{N/2^{m+1}-1} Y_{31}(k)\cos\left(\frac{\pi(2k+1)(2^{m+1}n+N/2+2^m)}{2N}\right), \quad (57)$$

$$\text{for } 0 \leq k \leq \frac{N}{2^m}-1$$

Thereafter, formula (57) is transformed in a manner as shown below depending on the range of values that n can take. Firstly, when n is between 0 and $N/(2^{\wedge}(m+2))-1$, $X_{32}$ are expressed by formula (58) below.

$$X_{34}(n) = \sum_{k=0}^{N/2^{m+1}-1} Y_{31}(k)\cos\left(\frac{\pi(2k+1)(2^{m+1}(n+N/2^{m+2})+2^m)}{2N}\right), \quad (58)$$

$$\text{for } 0 \leq k \leq \frac{N}{2^{m+2}}-1$$

When n is between $N/(2^{\wedge}(m+2))$ and $3N/(2^{\wedge}(m+2))-1$, $X_{32}$ are expressed by formula (59) below.

$$X_{34}(n) = -\sum_{k=0}^{N/2^{m+1}-1} Y_{31}(k)\cos\left(\frac{\pi(2k+1)(-2^{m+1}n-N/2-2^m)+\pi(2k+1)2N}{2N}\right) \quad (59)$$

$$= -\sum_{k=0}^{N/2^{m+1}-1} Y_{31}(k)\cos\left(\frac{\pi(2k+1)(2^{m+1}(3N/2^{m+2}-1-n)+2^m)}{2N}\right),$$

$$\text{for } \frac{N}{2^{m+2}} \leq n \leq \frac{3N}{2^{m+2}}-1$$

Finally, when n is between $3N/(2^{\wedge}(m+2))-1$ and $N/(2^{\wedge}m)-1$, $X_{32}$ are expressed by formula (60) below.

$$X_{34}(n) = -\sum_{k=0}^{N/2^{m+1}-1} Y_{31}(k)\cos\left(\frac{\pi(2k+1)(2^{m+1}n+N/2+2^m)-\pi(2k+1)2N}{2N}\right) \quad (60)$$

$$= -\sum_{k=0}^{N/2^{m+1}-1} Y_{31}(k)\cos\left(\frac{\pi(2k+1)(2^{m+1}(n-3N/2^{m+2})+2^m)}{2N}\right),$$

$$\text{for } \frac{N}{2^{m+2}} \leq n \leq \frac{N}{2^m}-1$$

Then, $X_{33}$ are produced by using formula (61) below and $X_{32}$ that are defined differently dependent on the range of values that n can take.

$$X_{34}(n) = \begin{cases} X_{35}\left(n+\dfrac{N}{2^{m+2}}\right), & \text{for } 0 \leq n \leq \dfrac{N}{2^{m+2}}-1 \\ -X_{35}\left(\dfrac{3N}{2^{m+2}}-1-n\right), & \text{for } \dfrac{N}{2^{m+2}} \leq n \leq \dfrac{3N}{2^{m+2}}-1 \\ -X_{35}\left(n-\dfrac{N}{2^{m+2}}\right), & \text{for } \dfrac{3N}{2^{m+2}} \leq n \leq \dfrac{N}{2^m}-1 \end{cases} \quad (61)$$

Therefore, formula (57) can be transformed into formula (62) below.

$$X_{35}(n) = \sum_{k=0}^{N/2^{m+1}-1} Y_{31}(k)\cos\left(\frac{\pi(2k+1)(2^{m+1}n+2^m)}{2N}\right), \quad (62)$$

$$= \sum_{k=0}^{N/2^{m+1}-1} Y_{31}(k)\cos\left(\frac{\pi(2k+1)(2n+1)}{2(N/2^m)}\right),$$

$$\text{for } 0 \leq n \leq \frac{N}{2^m}-1$$

Formula (63) below can be obtained by substituting formula (12) by formula (21) for the purpose of comparison.

Note that $x_1$ that is obtained when $C_0$ is equal to 1 in formula (12) is assumed to be equal to $x_{12}$.

$$x_{11}(n) = \sum_{k=0}^{N/2-1} y_1(k)\cos\left(\frac{\pi(2k+1)(2n+1)}{2N}\right), \text{ for } 0 \leq n \leq N-1 \quad (63)$$

By comparing formula (62) and formula (63), it will be appreciated that formula (63) is obtained by replacing $N/(2^n)$ in formula (62) by N. Therefore, it is possible to carry out the computations of formula (46) by carrying out the computations of formula (47) through formula (55) and performing an FFT with a tap length corresponding to $N/(2^{(m+2)})$ samples. Note that the range of values that m can take is same as that of formula (45).

As for window functions to be used for the purpose of the invention, formula (64) and formula (65) below can be used respectively for MDCT and IMDCT.

$$H_{01}(n) = \frac{h(2^m n + 2^{m-1} - 1) + h(2^m n + 2^{m-1})}{2}, \quad (64)$$
$$\text{for } 0 \leq n \leq \frac{N}{2^m} - 1$$

$$F_{01}(n) = \frac{f(2^m n + 2^{m-1} - 1) + f(2^m n + 2^{m-1})}{2}, \quad (65)$$
$$\text{for } 0 \leq n \leq \frac{N}{2^m} - 1$$

Note that h(n) and f(n) are window functions for forward transform and inverse transform that can be used when the band is not limited, whereas $H_{01}(n)$ and $F_{01}(n)$ are window functions to be used for the purpose of the present invention. Also note that m is not smaller than 1.

$$m \geq 1 \quad (66)$$

It should be noted that the above are only examples of window functions and other window functions may be used for forward transform and inverse transform.

Thus, with a signal processing device and a signal processing method according to the invention, when the frequency band is limited to $1/(2^m)$, the MDCT as defined by formula (28) above and the IMDCT as defined by formula (46) above can be realized by means of an FFT with a tap length corresponding to $N/(2^{(m+2)})$ samples. Therefore, as a result, both the number of arithmetic operations and the work area required for the operations can be remarkably reduced if compared with any known methods.

Now, on the basis of the above described principle of computations of the present invention, a signal processing device and a signal processing method according to the invention will be described by way of preferred embodiments.

Figure 4:
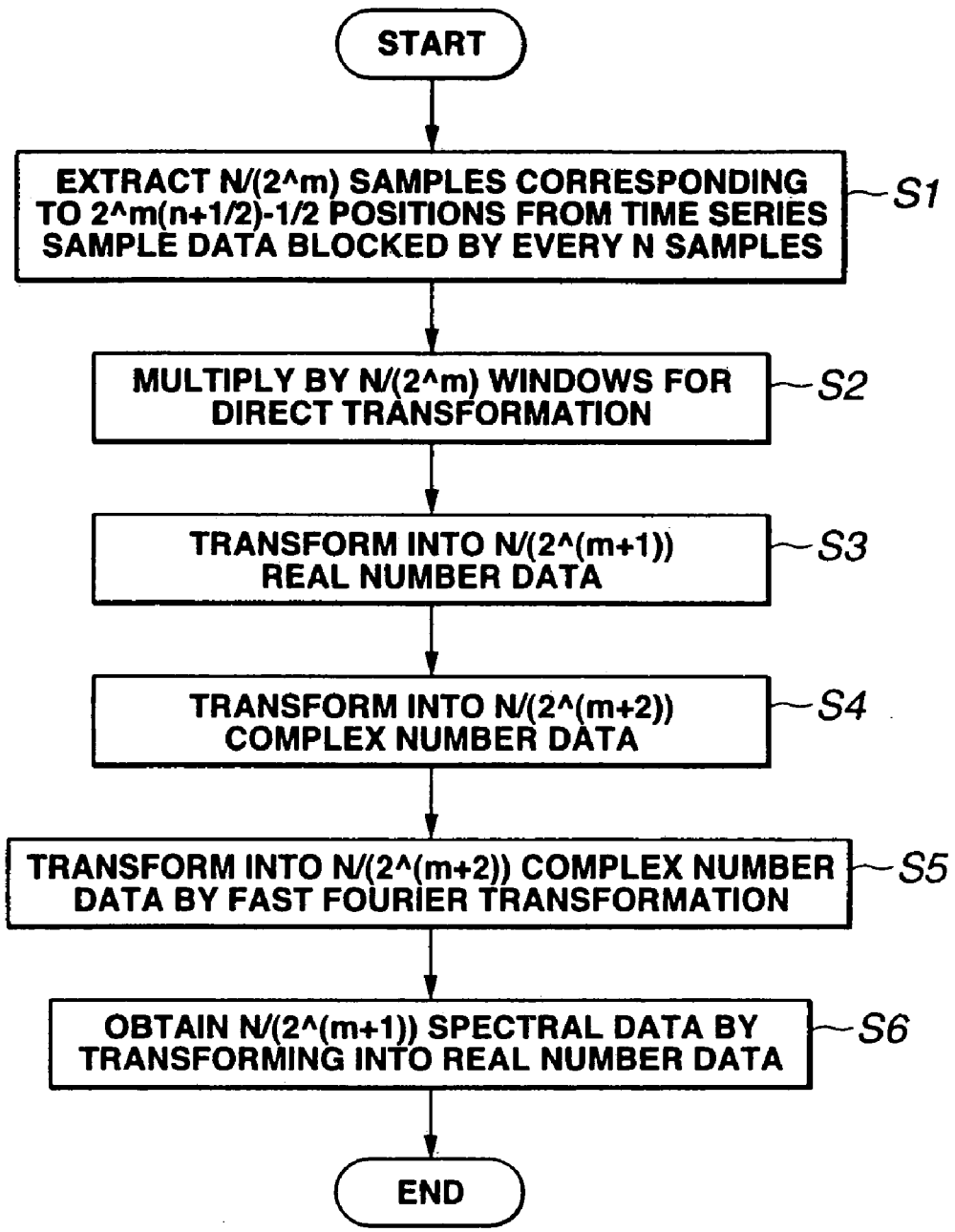
FIG. 4 is a flow chart of the steps of a basic mode of carrying out a signal processing method according to the invention and adapted to MDCT.

FIG. 4 is a flow chart of the forward transform processing operation of an embodiment of signal processing method according to the invention and adapted to MDCT that is conducted on the basis of the above described principle of computations.

Referring to FIG. 4, the input time series sample data, which may typically be PCM audio data, are firstly divided into blocks, each containing a predetermined number (N in FIG. 4) of samples, in Step S1.

As pointed out above, the number of the spectrums obtained by directly performing an MDCT on each block of N samples of the time series sample data is N/2. However, with this embodiment, the frequency band is limited to $1/(2^m)$ in order to make it possible to realize high speed arithmetic operations. The number of spectrums obtained by directly performing an MDCT on each block is $N/(2^{(m+1)})$ when the frequency band is limited to $1/(2^m)$.

Therefore, with this embodiment, N/2 samples that correspond to $(2^m/(n+\frac{1}{2}))-\frac{1}{2}$ positions are extracted from the N sample of the block to be transformed by MDCT in the above Step S1. It will be appreciated that the processing operation can be started from Step S2 to omit Step S1, if said block to be transformed contains $N/(-2$ $^m)$ samples from the start. The extracting operation may be carried out by using a filter of some sort or another or by some other means that is adapted to simply down-sample the data by $1/(2^m)$ (from $2^m n$ positions) and output the obtained samples. When the samples obtained by simple $1/(2^m)$ down-sampling (from $2^m n$ positions) are output, an error of $(2^m - 1)/2$ samples will be generated. Therefore, the technique of simple down-sampling may be used to simplify not only the sampling means but also the configuration of the entire system only when the error is permissible.

As described earlier by referring to FIG. 1, each block to be transformed is so arranged that it overlaps each of the adjacently located blocks by 500%, or by $N/(2^{(m+1)})$ samples.

Then, in Step S2, a window for forward transform to be used for $N/(2^m)$ samples are applied to the block produced in Step S1 for the purpose of transform. Subsequently, in Step S3, a transform operation as expressed by formula (30) and formula (31) is conducted. As a result, the sample data of the block to be transformed are actually transformed into $N/(2^{(m+2)})$ real number data $X_{24}$.

Then, in Step S4, the even-numbered data of the $N/(2^{(m+1)})$ real number data $X_{24}$ are allocated to real parts and odd-numbered data of the $N/(2^{(m+1)})$ real number data $X_{24}$ are allocated to imaginary parts and the obtained complex numbers are multiplied by a complex coefficient to realize the transform of formula (32) in order to transform $N/(2^{(+}1))$ real number data $X_{24}$ into $N/(2^{(m+2)})$ complex number data $Z_{21}$.

Thereafter, in Step 55, $N/(2^{(m+2)})$ complex number data $Z_{22}$ are obtained on the frequency axis by performing an FFT (fast Fourier transform) on the $N/(2^{(m+2)})$ complex number data $Z_{21}$ obtained in Step S4.

Then, in Step S6, $N/(2^{(m+1)})$ spectrum data $Y_{21}$ are obtained by carrying out the computations of formulas (34) through (38) on the complex number data $Z_{22}$ obtained in Step S5 and taken out as output data of the MDCT.

Figure 5:
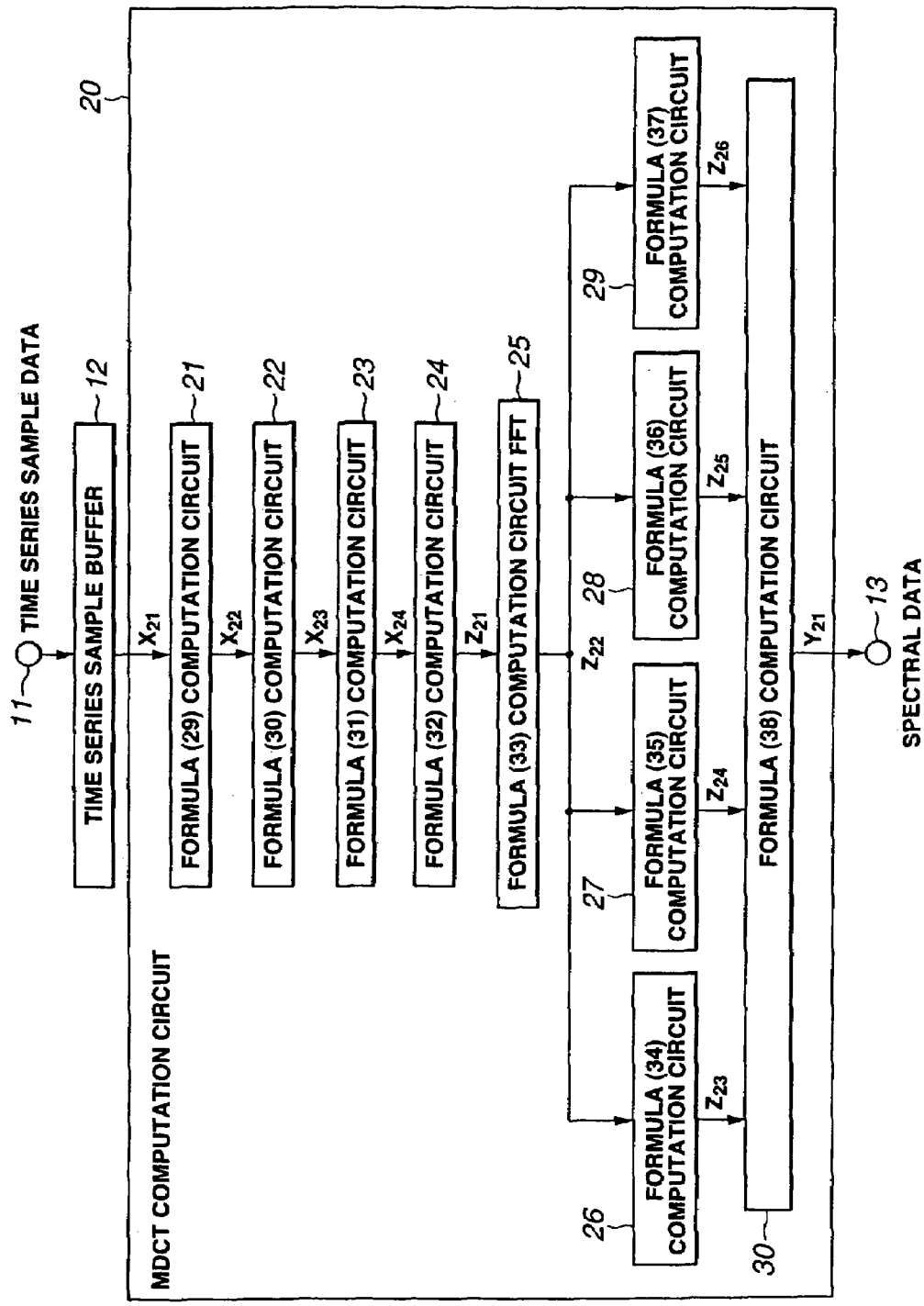
FIG. 5 is a schematic block diagram of an embodiment of signal processing apparatus according to the invention and adapted to MDCT.

FIG. 5 is a schematic block diagram of an embodiment of signal processing apparatus according to the invention and adapted to MDCT.

Referring to FIG. 5, time series sample data that may typically be PCM audio data are fed to input terminal 11 and then temporarily stored in time series sample buffer 12. Thereafter, they are divided into blocks, each containing a predetermined number of samples, for instance $N/(2^m)$ samples, and then sent to MDCT computation circuit 20.

The MDCT computation circuit 20 comprises formula (29) computation circuit 21, formula (30) computation circuit 22, formula (31) computation circuit 23, formula (32) computation circuit 24, formula (33) computation circuit 25, formula (34) computation circuit 26, formula (35) computation circuit 27, formula (36) computation circuit 28 and formula (37) computation circuit 29.

Thus, the MDCT computation circuit 20 sends the block data of $N/(2^m)$ samples sequentially to the formula (29) computation circuit 21 through the formula (33) computation circuit 25 in order to perform the computations of formula (29) through formula (33). It then sends the output $Z_{22}$ of the formula (33) computation circuit 25 obtained as a result of the computations there to the formula (34) computation circuit 26 through the formula (37) computation circuit 29 in parallel in order to perform the computations of the formulas (24) through (27). Subsequently, it sends the outputs $Z_{23}$, $Z_{24}$, $Z_{25}$ and $Z_{26}$ of the formula (34) computation circuit 26 through the formula (37) computation circuit 29 to formula (38) computation circuit 30 in order to perform the computations of the formula (38). Finally, it sends the output $Y_{21}$ of the formula (38) computation circuit 30 to computation result output terminal 13, which produces the output $Y_{21}$ as the spectrum data obtained as a result of the MDCT computations.

Figure 6:
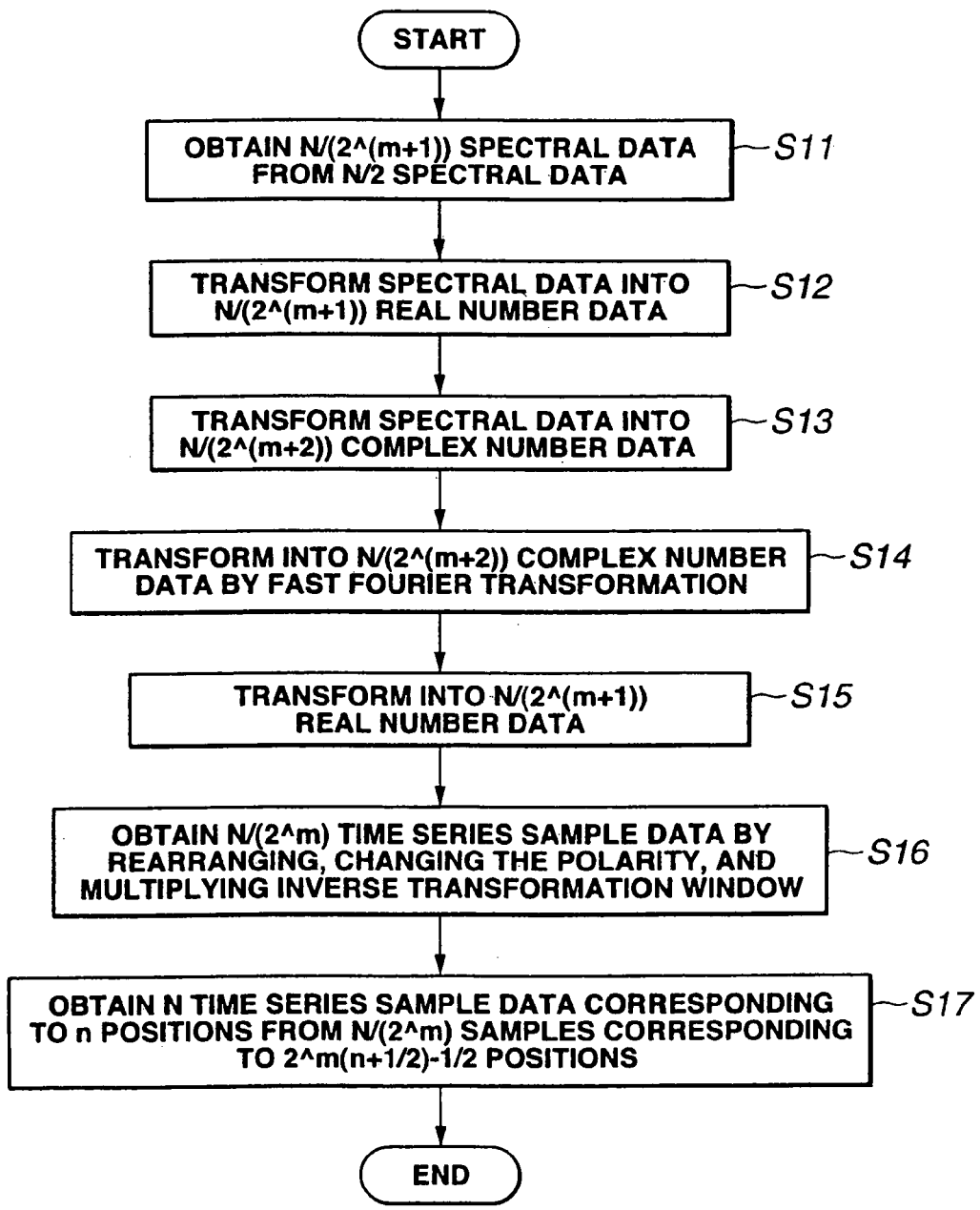
FIG. 6 is a flow chart of the steps of a basic mode of carrying out a signal processing method according to the invention and adapted to IMDCT.

On the other hand, FIG. 6 is a flow chart of the inverse transform processing operation of an embodiment of signal processing method according to the invention and adapted to IMDCT that is conducted on the basis of the above described principle of computations.

Referring to FIG. 6, in the inverse transform processing operation, $N/(2^{\wedge}(m+1))$ data are taken out of the input N/2 spectrum data in Step S11. The taken out data may by the $N/(2^{\wedge}(m+1))$ data of lower order or those of upper order or in the middle of the band from a total of the original N/2 spectrum data. Note, however, that the taken out spectrum data have to be sequential data as described earlier by referring to FIG. 2.

Then, in Step S12, the $N/(2^{\wedge}(m+1))$ data are subjected to an operation of changing the polarity and that of rearrangement as shown in formula (47) above. As a result, the $N/(2^{\wedge}(m+1))$ spectrum data $Y_{31}$ are transformed into $N/(2^{\wedge}(m+1))$ real number data $Y_{32}$.

Then, in Step S13, the even-numbered data of the $N/(2^{\wedge}(m+1))$ real number data $Y_{32}$ are allocated to real parts and odd-numbered data of the $N/(2^{\wedge}(m+1))$ real number data $Y_{32}$ are allocated to imaginary parts and the obtained complex numbers are multiplied by a complex coefficient to realize the transform of formula (48) in order to transform $N/(2^{\wedge}(m+1))$ real number data $Y_{32}$ into $N/(2^{\wedge}(m+2))$ complex number data $Z_{31}$.

Thereafter, in Step S14, $N/(2^{\wedge}(m+2))$ complex number data $Z_{32}$ are obtained on the frequency axis by performing an FFT (fast Fourier transform) on the $N/(2^{\wedge}(m+2))$ complex number data $Z_{31}$ obtained in Step S13.

Then, in Step S15, $N/(2^{\wedge}(m+1))$ real number data $X_{33}$ are obtained by carrying out the computations of formulas (50) through (54) on the complex number data $Z_{32}$ obtained in Step S14.

Then, in Step S16, the real number data $X_{33}$ obtained in Step S15 are subjected to a transform operation as expressed by formula (55) to obtain $N/(2^{\wedge}m)$ real number data $X_{32}$, which are subjected to a processing operation of the formula (56) using a window.

Finally, in Step S17, $N/(2^{\wedge}m)$ through N time series sample data that correspond to the positions from position $(2^{\wedge}m(n+1))-\frac{1}{2}$ to position n are obtained out of the real number data $X_{32}$ that are obtained in Step S16. It may be appreciated that Step S17 can be omitted and the $N/(2^{\wedge}m)$ sample data obtained as output of Step S16 may be used as output of the above entire process. The above sample taking out operation may be carried out by using a filter of some sort or another or by some other means that is adapted to simply up-sample the data to $2^{\wedge}m$ (to $2^{\wedge}mn$ positions) and output the obtained samples. When the samples obtained by simple $2^{\wedge}m$ up-sampling (to $2^{\wedge}mn$ positions) are output, a delay corresponding to $(2^{\wedge}m-1)/2$ samples will occur. Therefore, the technique of simple up-sampling may be used to simplify not only the sampling means but also the configuration of the entire system only when the delay is permissible.

Figure 7:
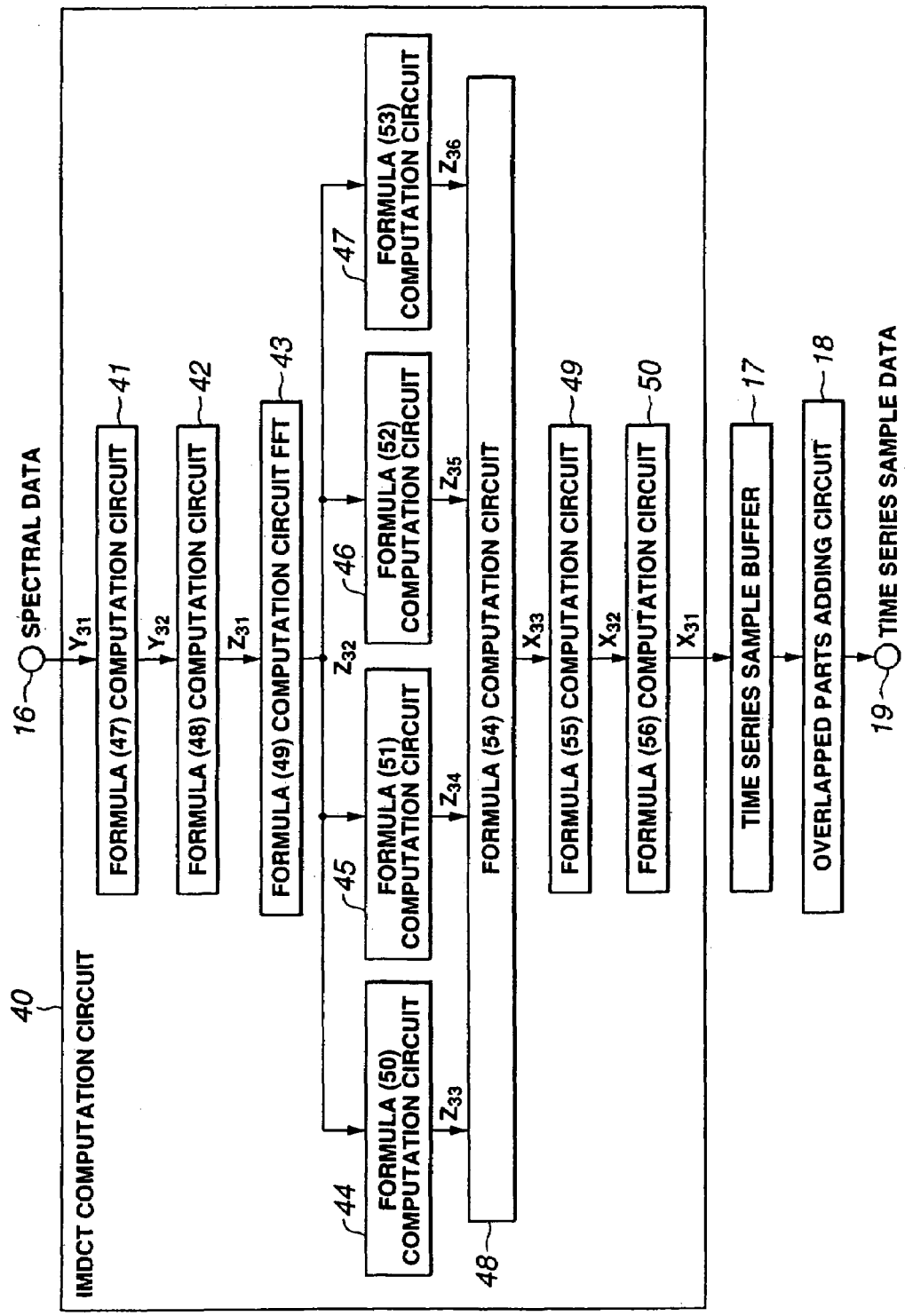
FIG. 7 is a schematic block diagram of an embodiment of signal processing apparatus according to the invention and adapted to IMDCT.

FIG. 7 is a schematic block diagram of an embodiment of signal processing apparatus according to the invention and adapted to IMDCT and providing time series data out of the output thereof.

Referring to FIG. 7, the $N/(2^{\wedge}(m+1))$ spectrum data $Y_{31}$ obtained by the above described MDCT process (a general MDCT when m=0) are fed to input terminal 16 and then forwarded to formula (47) computation circuit 41 of the IMDCT computation circuit 40.

The formula (47), computation circuit 41 performs the computations of formula ((47) and the output $Y_{32}$ of the computations are sent sequentially to the formula (48) computation circuit 42 and formula (49) computation circuit 43 in order to perform the computations of formula (48) and formula (49). The output $Z_{32}$ of the formula (49) computation circuit 43 obtained as a result of the computations are then sent to formula (50) computation circuit 44, formula (51) computation circuit 45, formula (52) computation-circuit 46 and formula (53) computation circuit 47.

The formula (50) computation circuit 44, the formula (51) computation circuit 45, the formula (52) computation circuit 46 and the formula (53) computation circuit 47 respectively carry-out the computations of the formula (50), the formula (51), the formula (52) and the formula (53) and their respective outputs $Z_{33}$, $Z_{34}$, $Z_{35}$ and $Z_{36}$ are sent to formula (54) computation circuit 48.

The formula (54) computation circuit 48 carries out the computations of said formula (54) and the output $X_{33}$ thereof is sent to formula (55) computation circuit 49.

The formula (55) computation circuit 49 carries out the computations of said formula (55) and the output $X_{32}$ thereof is sent to formula (56) computation circuit 50.

The formula (56) computation circuit 50 performs a processing operation of the formula (56) using a window and the output $X_{31}$ of the formula (56) computation circuit 50 is sent to the time series sample buffer 17 as the output of the IMDCT computation circuit 40.

The time series sample buffer 17 temporarily stores the output $X_{31}$ and thereafter reads it out to send it to overlapping part adding circuit 18, which overlapping part adding circuit 18 adds the overlapping parts. The data obtained as a result of the addition are then taken out from output terminal 19 as time series sample data. In other words, the data obtained from the IMDCT computation circuit 40 are multiplied by a window for inverse transform and IMDCT output data of the two adjacent blocks are added to produce time series sample data to be output.

Figure 9:
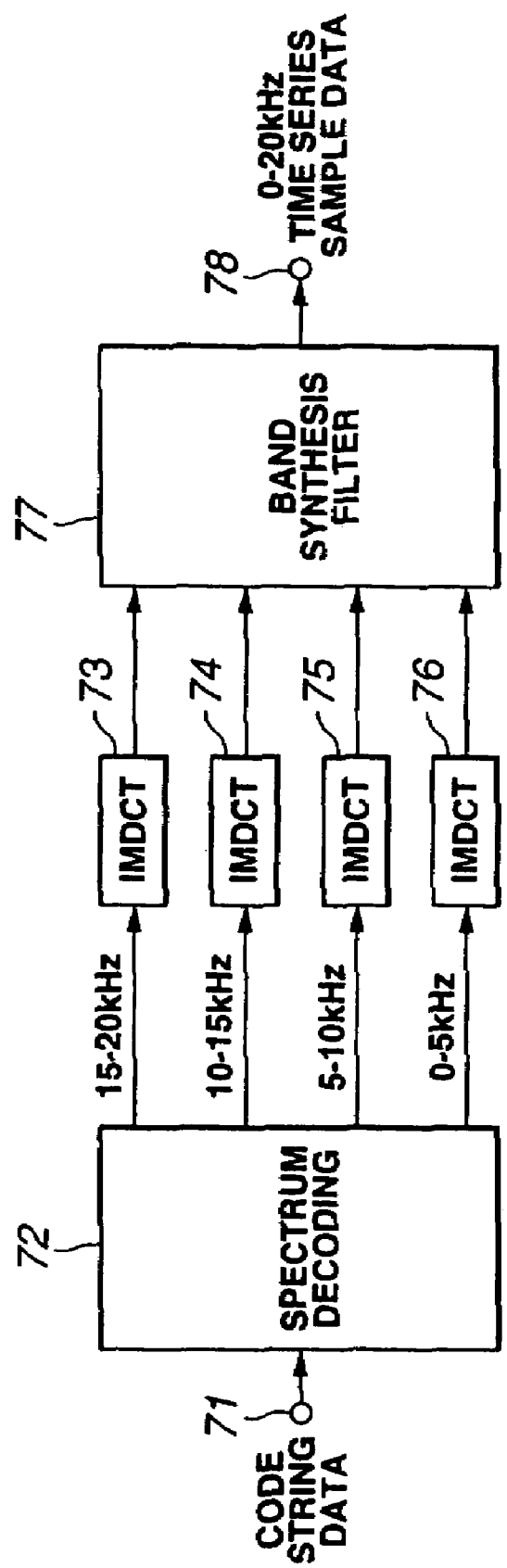
FIG. 9 is a schematic block diagram of a high efficiency decoder adapted to decode a code string produced by the encoder of FIG. 8 by means of a code string band synthesis filter.
Figure 10:
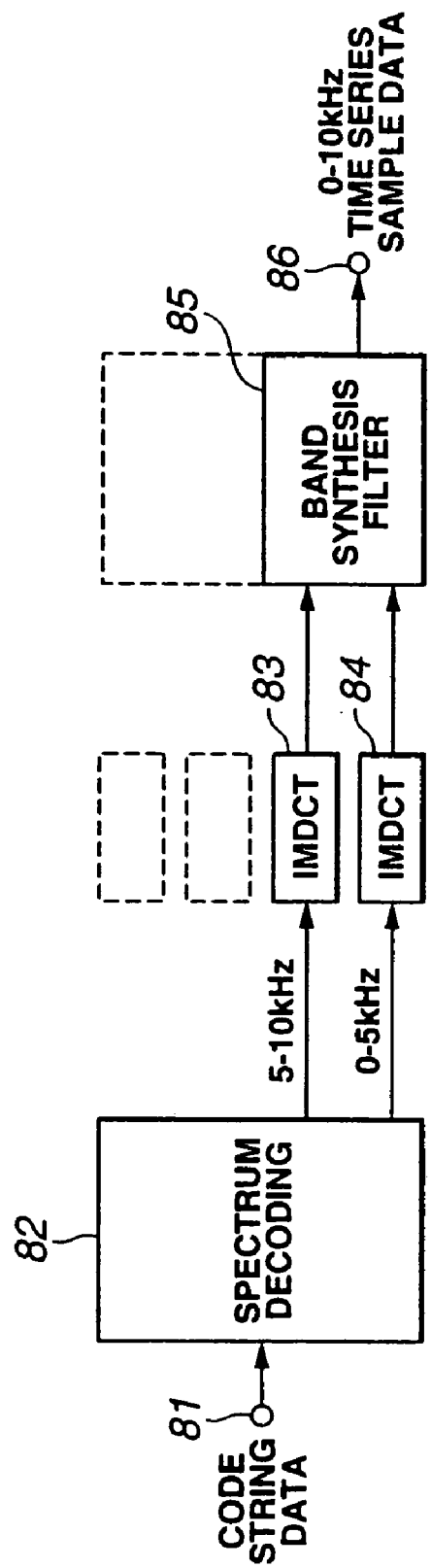
FIG. 10 is a schematic block diagram of the decoder of FIG. 9, showing that it has a scalability when adapted to decode only bands of lower orders.

Now, a high efficiency encoder and a high efficiency decoder to which MDCT and IMDCT are applied according to the invention will be described as examples by referring to FIGS. 8 through 12. Note that FIGS. 11 and 12 respectively shows a principal area of the high efficiency encoder and that of the high efficiency decoder to which the present invention is applicable, whereas FIGS. 8 through 10 shows a high efficiency encoder and a high efficiency decoder to be used respectively with ordinary MDCT and IMDCT for the purpose of comparison.

Figure 8:
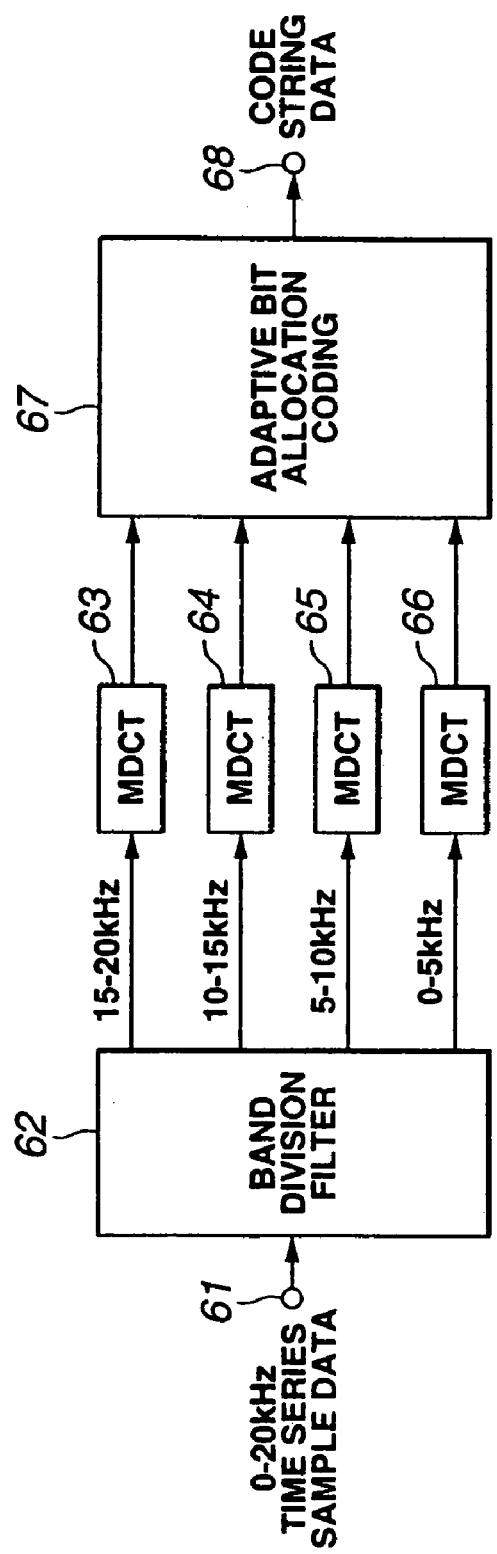
FIG. 8 is a schematic block diagram of a high efficiency encoder using a sub-band filter, showing its circuit configuration.

Firstly, the high efficiency encoder of FIG. 8 utilizes the technique of subband coding, that of adaptive transform coding and that of adaptive bit allocation. More specifically, the input-digital signal that ma typically be a PCM audio signal is divided into a plurality of frequency bands, of which those showing a high frequency are made to have a large band width, and each of the frequency bands is subjected to an MDCT, which is an orthogonal transform. Then, the obtained spectrum data on the frequency axis are encoded by adaptively allocating bits to each critical band.

Referring to FIG. 8, a time series. PCM audio signal having a frequency band from 0 to 20 kHz is typically supplied to input terminal 61. The frequency band of the input signal is divided into a 0 to 5 kHz band, a 5 to 10 kHz band, a 10 to 15 kHz band and a 15 to 20 kHz band by means of a sub-band filter 62 that may typically be a so-callsed PQF filter, although a two-staged QMF filter or some other sub-band filter may alternatively be used for the purpose of the invention.

Of the time series signals obtained by dividing the band of the original time series signal by means of the sub-band filter 62, the one with the band from 0 to 5 kHz is fed to MDCT circuit 66, while the one with the band from 5 to 10 kHz is fed to MDCT circuit 65, while the one with the band from 10 to 15 kHz is fed to MDCT circuit 64 and the one with the band from 15 to 20 kHz is fed to MDCT circuit 63 for an MDCT processing operation. Each of the MDCT circuits 63 through 66 performs an MDCT processing operation on its input signal with the corresponding band to transform the signal into a spectrum signal or a coefficient data on the frequency axis.

The spectrum signals or the coefficient data on the frequency axis obtained by the respective MDCT processing operations of the MDCT circuits 63 through 66 are then grouped to so-called critical bands and sent to adaptive bit allocation coding circuit 67. A critical band is a frequency band obtained by dividing the band of a signal, taking the characteristics of the auditory sense of human being into consideration. In other words, it refers to the band of a narrow band noise that masks a pure sound of a frequency close to that of the noise. A critical band of relatively high frequency has a bandwidth greater than that of relatively low frequency. The overall frequency band from 0 to 20 kHz may typically be divided into 25 critical bands.

The adaptive bit allocation coding circuit 67 normalizes each spectrum signal contained in each of the critical bands by the scale factor; or the maximum value of the absolute values of the spectrum signal and re-quantizes the normalized spectrum signal with the number of bits by which the quantization noise is masked by the signals in the critical band. Then, the circuit 67 outputs the re-quantized spectrum signal with the scale factor determined for each critical band and the number of bits used for the re-quantization.

The data coded in this way are then output as code string data from the output terminal 68 of the high efficiency encoder of FIG. 6.

FIG. 9 is a schematic block diagram of a high efficiency decoder corresponding to the high efficiency encoder of FIG. 8.

The scale factor, the number of bits used for the re-quantization and the data obtained by coding the re-quantized spectrum signal are applied to input terminal 71 of FIG. 9 and forwarded to spectrum decoding circuit 72. The spectrum decoding circuit 72 forms spectrum signals from the input data. Of the spectrum signals formed by the spectrum decoding circuit 72, the one with the band from 15 to 20 kHz is sent to IMDCT circuit 73, the one with the band from 10 to 15 kHz is sent to IMDCT circuit 74, whereas the one with the band from 5 to 10 kHz is sent to IMDCT circuit 75 and the one with the band from 0 to 5 kHz is sent to IMDCT circuit 76.

Each of the IMDCT circuit 73 through 76 performs an. IMDCT processing operation on the input spectrum signal with the corresponding band to transform it into a time series signal. The obtained four time series signals are then sent to band synthesis filter 77.

The band synthesis filter 77 synthetically combines the four time series signals with the respective bands to produce a time series signal of the entire band (0 to 20 kHz).

The time series signal of the entire band is output from the output terminal 78 of the high efficiency encoder of FIG. 9.

One of the advantages of a high efficiency encoder using such a sub-band filter is that it has a scalability, which will be discussed by referring to FIG. 10.

FIG. 10 is a schematic block diagram of the decoder of FIG. 9, showing that it has a scalability when adapted to decode only bands of lower orders. Referring to FIG. 10, the scale factor, the number of bits used for the re-quantization and the data obtained by coding the re-quantized spectrum signal are applied to input terminal 71 and forwarded to spectrum decoding circuit 82.

The spectrum decoding circuit 82 forms spectrum signals from the input data. Then, the spectrum decoding circuit 82 takes out the spectrum signal with the band from 0 to 5 kHz and the one with the band from 5 to 10 kHz out of the spectrum signals formed by it and sends the latter signal to IMDCT circuit 83 and the former signal to IMDCT circuit 84.

Each of the IMDCT circuit 83 and 84 performs an IMDCT processing operation on the input spectrum signal with the corresponding band to transform it into a time series signal. The two time series signals output from the IMDCT circuits 83, 84 are then sent to band synthesis filter 85.

The band synthesis filter 85 synthetically combines the two time series signals with the respective bands to produce a time series signal of the band from 0 to 10 kHz.

Then, the time series signal with the band from 0 to 10 kHz is sent out from output terminal 86 of the high efficiency decoder of FIG. 10.

If compared with the decoder of FIG. 9, that of FIG. 10 has only two. IMDCT circuits and hence the band synthesis filter 85 is required only to synthetically combine two signals with the respective bands. Therefore, the decoder of FIG. 10 can be down-sized relative to that of FIG. 9 (and hence is adapted to a device whose circuit configuration is limited in size).

On the other hand, according to the invention, it is possible to provide a scalability at the time of decoding without using a sub-band filter.

Figure 11:
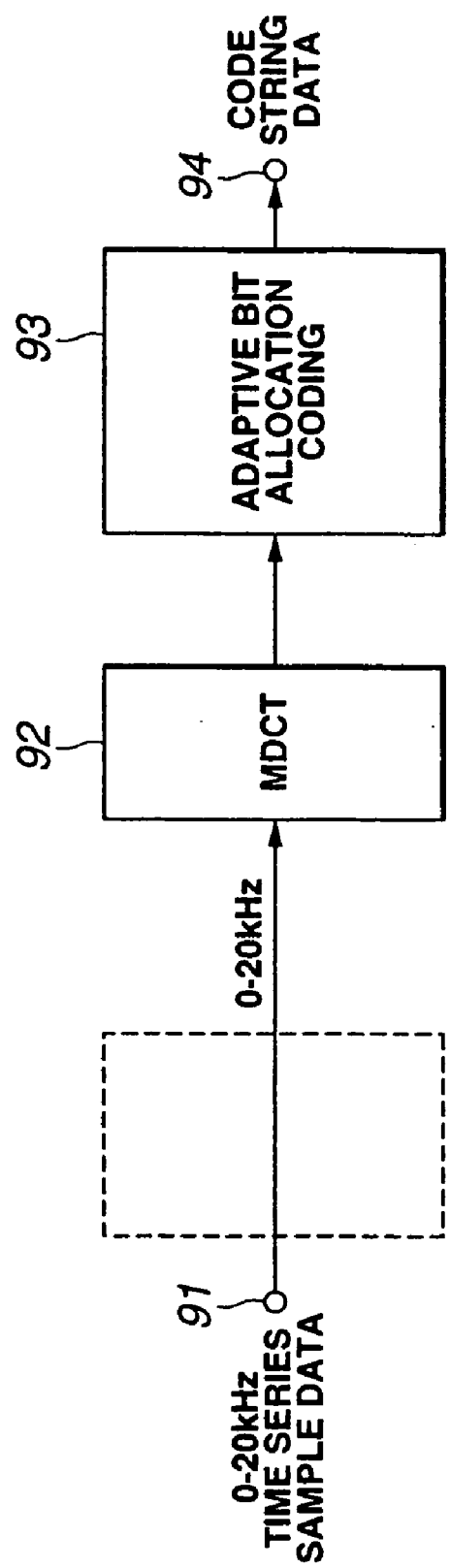
FIG. 11 is a schematic block diagram of a high efficiency: encoder, to which a signal processing method according to the invention and adapted to IMDCT is applied to make it have a scalability, showing its circuit configuration that is simple and adapted to high speed operations.

FIG. 11 is a schematic block diagram of a high efficiency encoder that does not require a sub-band filter unlike the encoder of FIG. 8 because a signal processing method according to the invention is applied to it.

Referring to FIG. 11, a time series PCM audio signal with a band from 0 to 20 kHz is applied to input terminal 91. The time series signal with the band from 0 to 20 kHz is then forwarded to MDCT circuit 92. The MDCT circuit 92 performs an MDCT processing operation on the input signal having the entire band between 0 and 20 kHz to transform it into a spectrum signal or a coefficient data on the frequency axis.

The spectrum signal or the coefficient data on the frequency axis obtained as a result of the MDCT processing operation of the MDCT circuit 92 is then sent to adaptive bit allocation coding circuit 93 that is similar to the adaptive bit allocation coding circuit 67 of FIG. 8 and coded by the circuit 93.

The coded data is then output: as code string data from output terminal 94 of the high efficiency encoder of FIG. 11.

Figure 12:
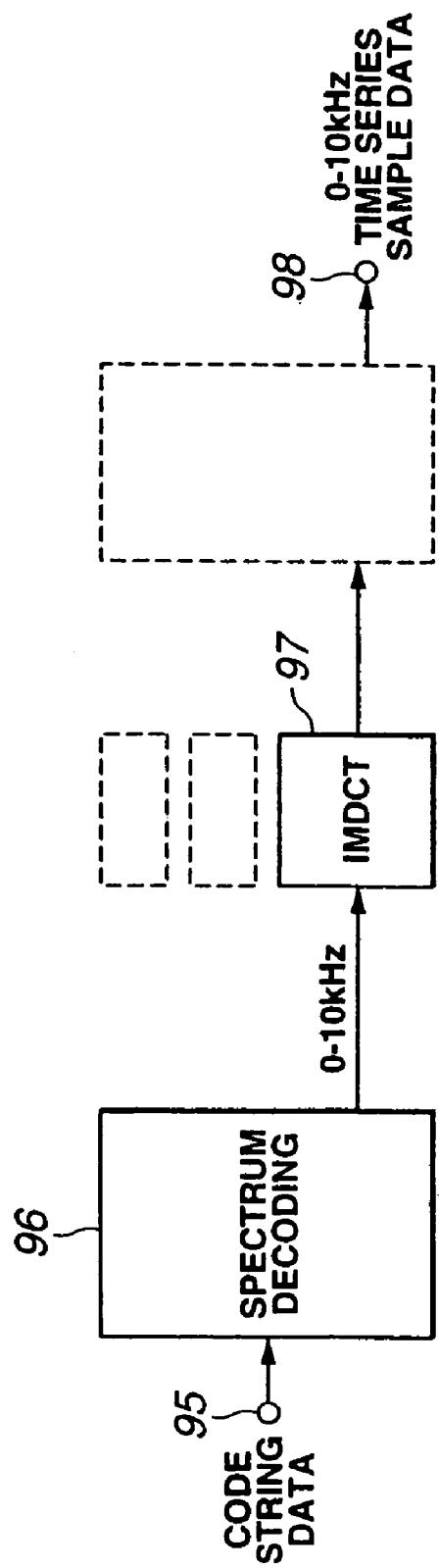
FIG. 12 is a schematic block diagram of a high efficiency decoder, to which a signal processing method according to the invention and adapted to IMDCT is applied to a code string generated by the encoder of FIG. 11 to make it have a scalability like that of FIG. 10, showing its circuit configuration that is simple and adapted to high speed operations.

FIG. 12 is a schematic block diagram of a high efficiency decoder adapted to IMDCT and designed to receive the code string data generated by the high efficiency encoder of FIG. 11, showing its circuit configuration.

Referring to FIG. 12, a code string data encoded by a high efficiency encoder like the one shown in FIG. 11 is applied to input terminal 95. The code string data is then forwarded to spectrum-decoding circuit 96.

The spectrum decoding circuit 96 forms a spectrum signal with a band from 0 to 20 kHz from the input code string data. At this time, the spectrum decoding circuit 96 takes out a spectrum signal with a band from 0 to 10 kHz or the lower half of the 0 to 20 kHz band and sends it to the IMDCT circuit 97.

The IMDCT circuit 97 performs an IMDCT processing operation according to the invention on the signal of the above defined band to transform it into a time series signal. The time series signal output from the IMDCT circuit 97 is then output from output terminal 98 of the high efficiency decoder of FIG. 12.

Thus, a decoder as illustrated in FIG. 12 can take out a time series sample data of a band from 0 to 10 kHz without using a band synthesis filter.

Since the above example is designed to take out the lower half (0 to 10 kHz) of the band from 0 to 20 kHz, the processing operation of the decoder of FIG. 12 correspond to the arithmetic operations of the above listed corresponding formulas, using m=1. If it is possible to take out the lower half (0 to 5 kHz) of the band from 0 to 10 kHz (or the lowest quarter of the entire band), the volume of the overall arithmetic operations can be reduced further by using m=2 instead of using m=1.

Thus, according to the invention, it is possible to provide the band and the volume of processing operations with a scalability of the order of $2^m$.

While a PQF is used as sub-band filter in the above description, according to the invention, it is also possible to cascade-connect QMFs and the band is divided into equal sub-bands. Additionally, according to the invention, it is also possible to divide the band into sub-bands showing a bandwidth ratio of 1:2:4: . . . , or octave sub-bands.

Now, a code string transform device for transforming the first code string into the second code string and a code string transform device for transforming the second code string into the first code string that are realized by using a high efficiency encoder and a high efficiency decoder to which MDCT and IMDCT are applicable according to the invention will be described by referring to FIGS. 13 through FIG. 20.

Figure 13:
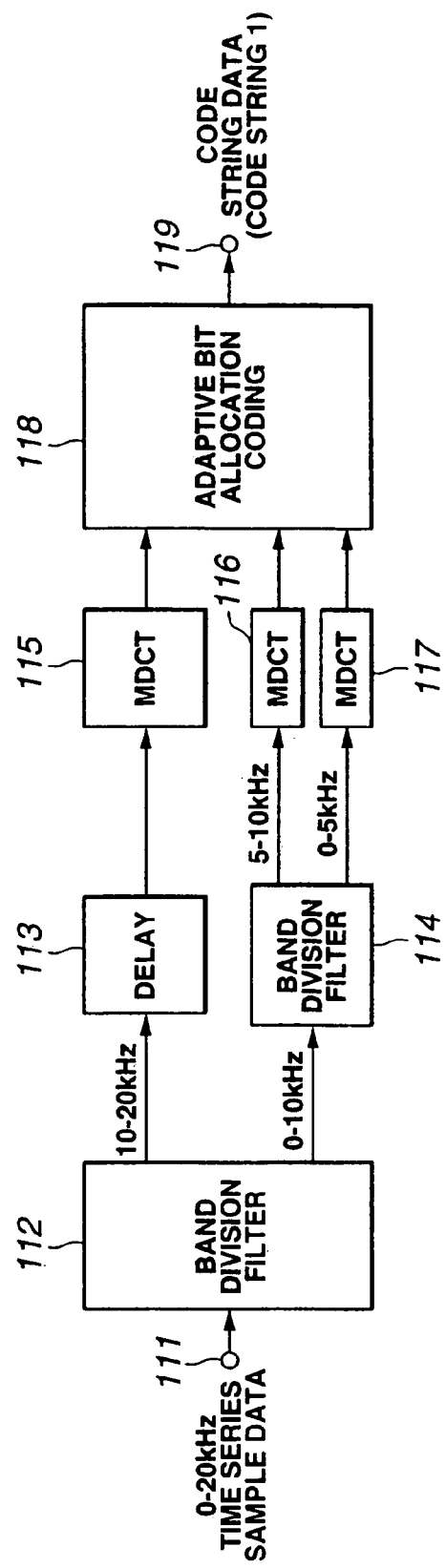
FIG. 13 is a schematic block diagram of a high efficiency encoder adapted to transform time series sample data into a first code string, showing its circuit configuration.
Figure 14:
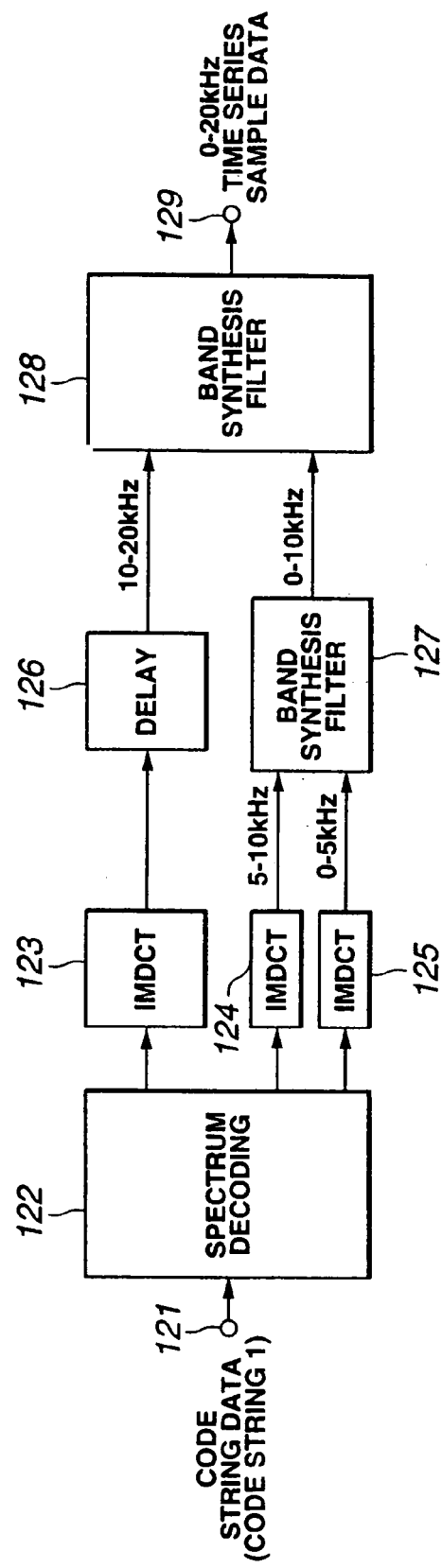
FIG. 14 is a schematic block diagram of a high efficiency decoder adapted to transform the first code string into time series sample data, showing its circuit configuration.
Figure 15:
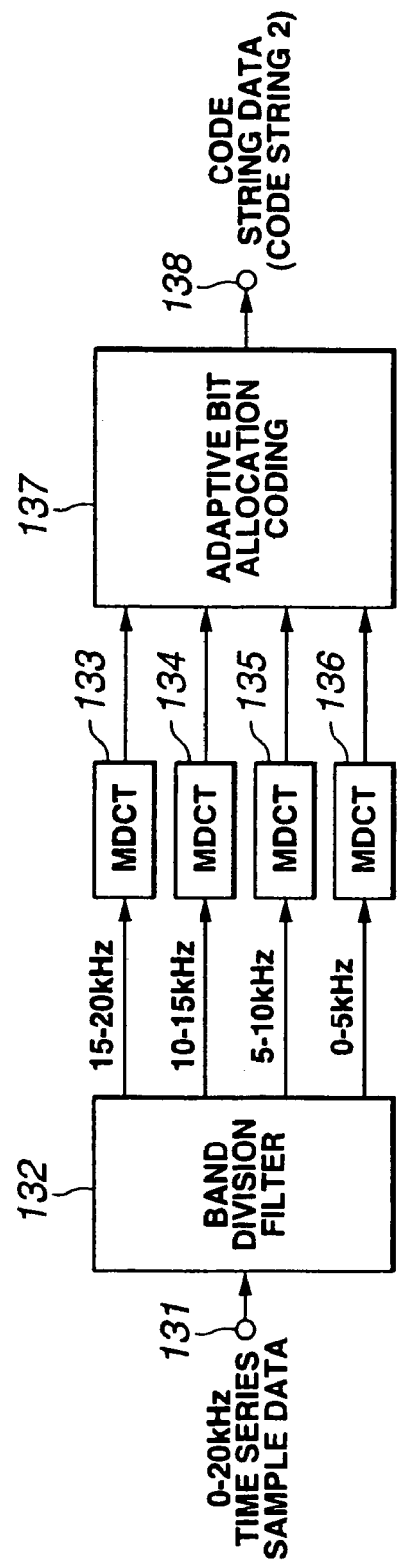
FIG. 15 is a schematic block diagram of a high efficiency encoder adapted to transform the time series sample data into a second code string, showing its circuit configuration.
Figure 16:
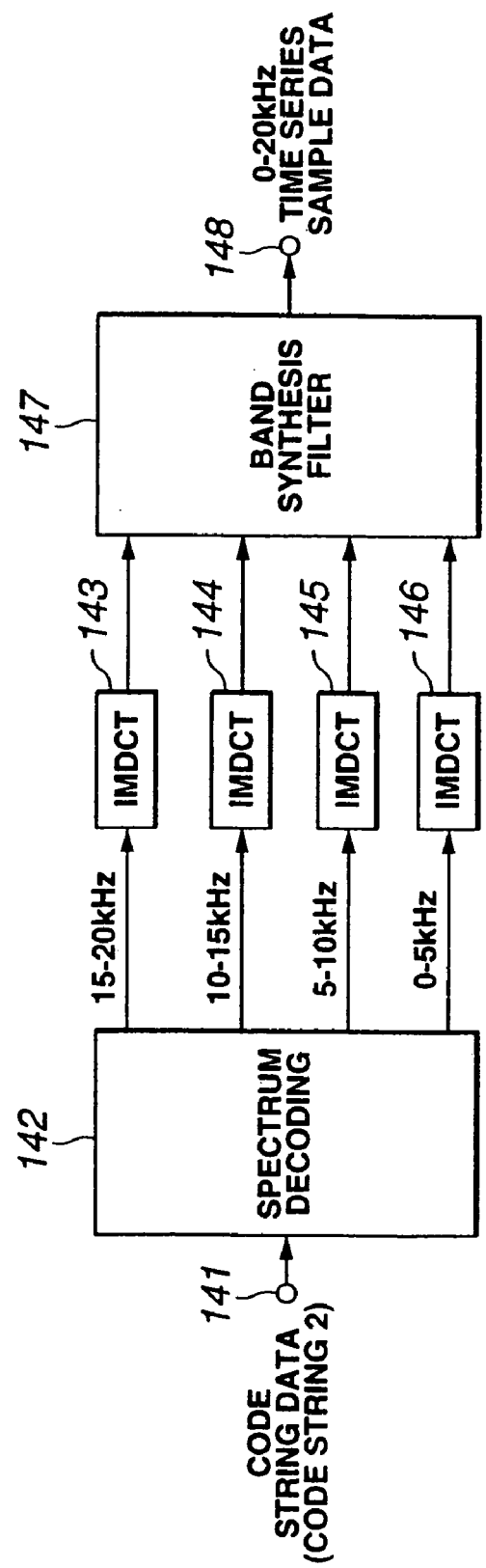
FIG. 16 is a schematic block diagram of a high efficiency decoder adapted to transform the second code string into time series sample data, showing its circuit configuration.
Figure 17:
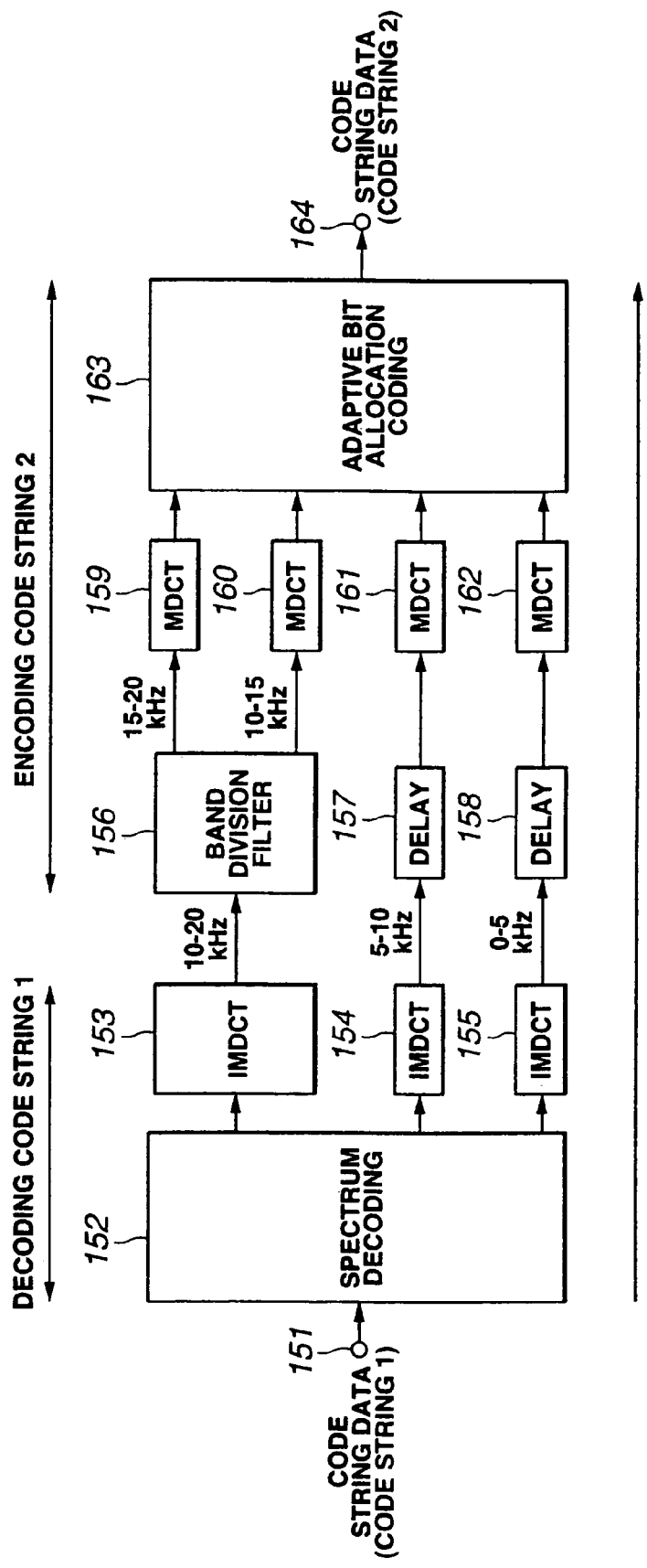
FIG. 17 is a schematic block diagram of a code string transform device adapted to transform the first code string into the second code string, showing its circuit configuration.
Figure 18:
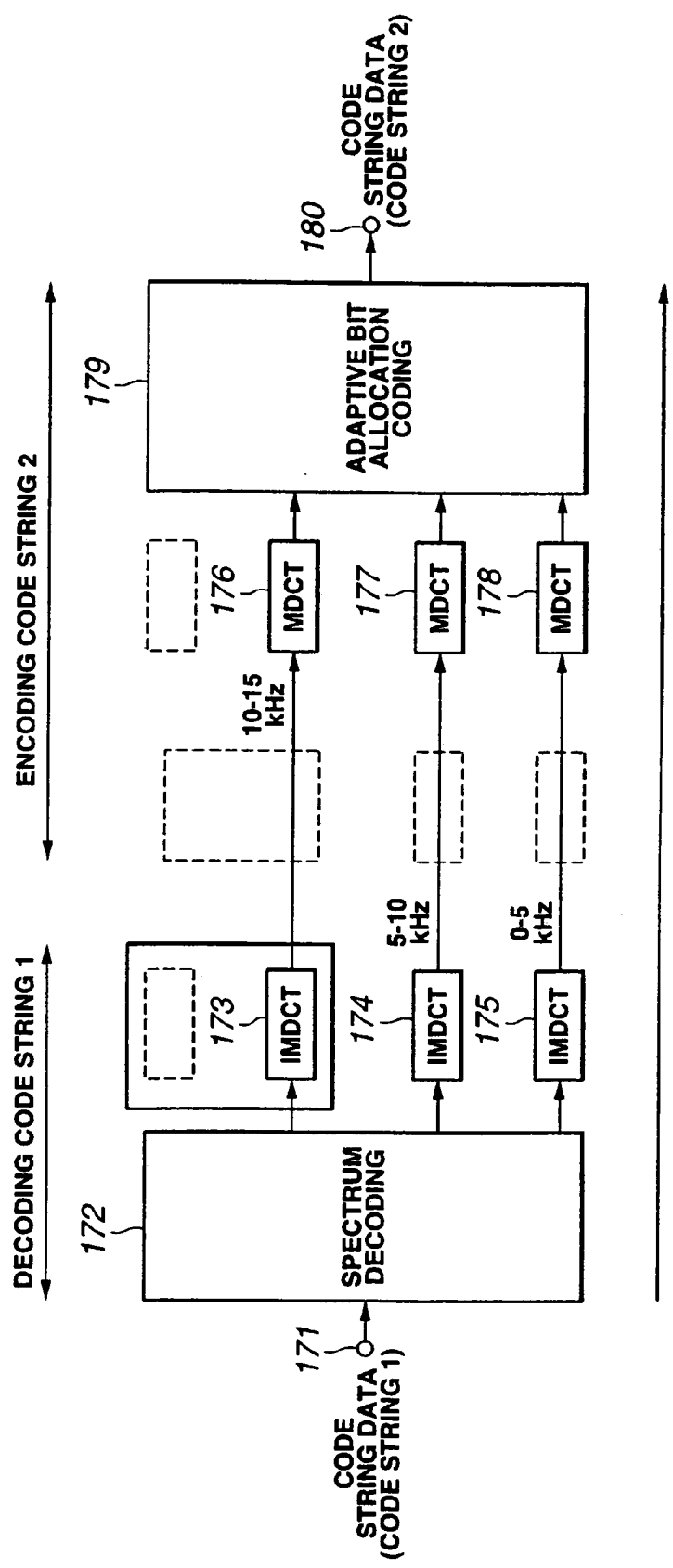
FIG. 18 is a schematic block diagram of a code string transform device adapted to transform the first code string into the second code string, to which a signal processing method according to the invention and adapted to IMDCT is applied, showing its circuit configuration.
Figure 19:
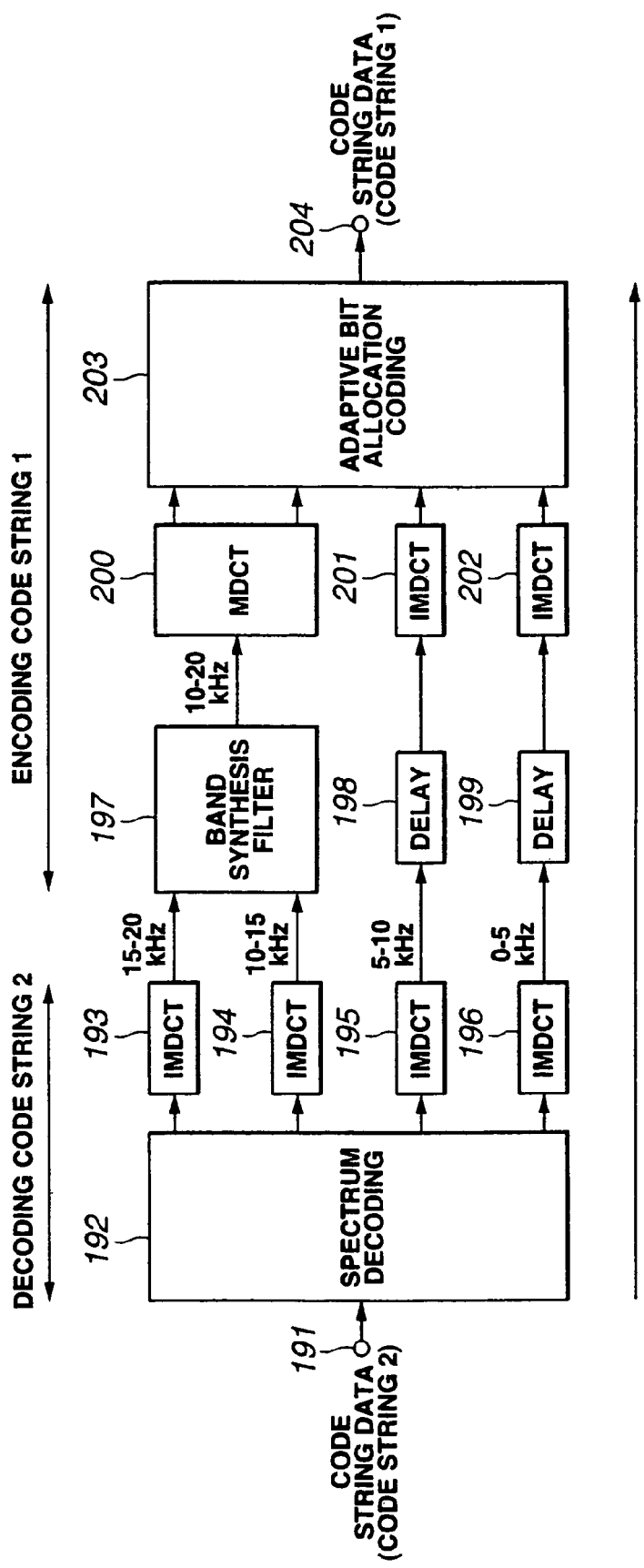
FIG. 19 is a schematic block diagram of a code string transform device adapted to transform the second code string into the first code string, showing its circuit configuration.
Figure 20:
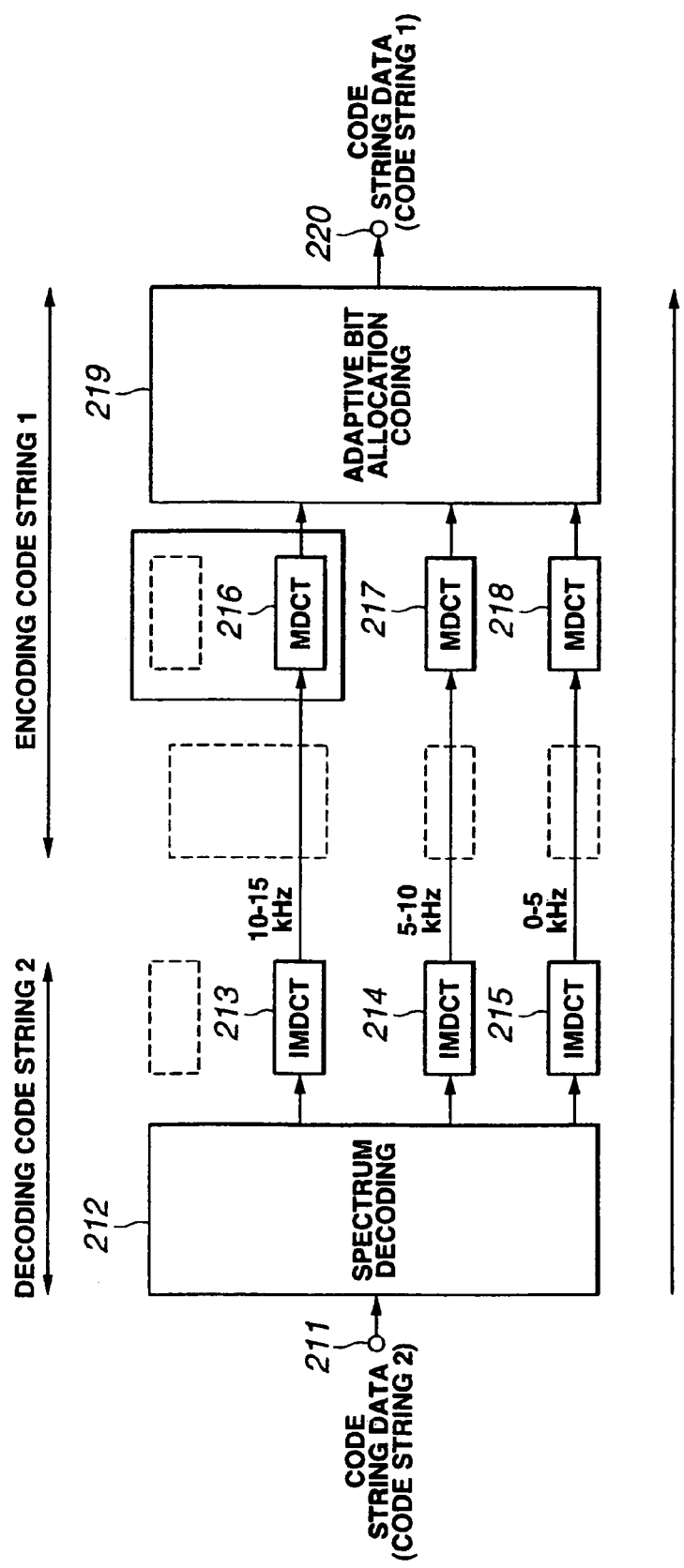
FIG. 20 is a schematic block diagram of a code string transform device adapted to transform the second code string into the first code string, to which a signal processing method according to the invention and adapted to MDCT is applied, showing its circuit configuration.

FIGS. 18 and 20 show code string transform devices to which the present invention is applied. More specifically, FIGS. 18 is a schematic block diagrams of a code string transform device adapted to transform the first code string into the second code string and realized by using a high efficiency encoder and a high efficiency decoder to which a signal processing method according to the invention and adapted to IMDCT is applied, showing its circuit configuration and FIG. 20 is a schematic block diagram of a code string transform device adapted to transform the second code string into the first code string and realized by using a high efficiency encoder and a high efficiency decoder to which a signal processing method according to the invention and adapted to IMDCT is applied, showing its circuit configuration. On the other hand, FIGS. 17 and 19 show code string transform devices realized by using a high efficiency encoder and a high efficiency decoder to which ordinary MDCT and IMDCT are applicable. These devices are shown for the purpose of comparison with the code string transform devices according to the invention. More specifically, FIG. 17 is a schematic block diagram of a code string transform device adapted to transform the first code string into the second code string, showing its circuit configuration and FIG. 19 is a schematic block diagram of a code string transform device adapted to transform the second code string into the first code string, showing its circuit configuration. FIG. 13 is a schematic block diagram of a high efficiency encoder adapted to transform time series sample data into a first code string, showing its circuit configuration and FIG. 14 is a schematic block diagram of a high efficiency decoder adapted to transform the first code string of FIG. 13 into time series sample data, showing its circuit configuration, whereas FIG. 15 is a schematic block diagram of a high efficiency encoder adapted to transform the time series sample data of FIG. 14 into a second code string, showing its circuit configuration and FIG. 16 is a schematic block diagram of a high efficiency decoder adapted to transform the second code string of FIG. 15 into time series sample data, showing its circuit configuration.

Firstly, referring to FIG. 13, a time series sample data with a frequency band from 0 to 20 kHz is supplied to input terminal 111 of the high efficiency encoder as input signal. The input signal is divided into a signal with a frequency band from 0 to 10 kHz and a signal with a frequency band from 10 to 20 kHz by sub-band filter 112 which may be a so-called QMF filter. The signal with the frequency band from 0 to 10 kHz output from the sub-band filter 112 is further divided into a signal with a frequency band from 0 to 5 kHz and a signal with a frequency band from 5 to 10 kHz by sub-band filter 114 which may also be a QMF filter.

The signal with the frequency band from 10 to 20 kHz output from the sub-band filter 112 is then sent to MDCT circuit 115 by way of a delay circuit 113 showing a delay time corresponding to the delay time of the sub-band filter, while the signal with the frequency band from 5 to 10 kHz is sent to MDCT circuit 116 and the signal with the frequency band from 0 to 5 kHz is sent to MDCT circuit 117. The MDCT circuits 115 through 117 perform a MDCT processing operation on the respective input signals having the respective frequency bands. The spectrum data obtained as a result of the MDCT processing operations of the MDCT circuits 115 through 117 are then sent to adaptive bit allocation coding circuit 118.

The adaptive bit allocation coding circuit 118 encodes the input spectrum data in a manner as described earlier and transforms the coded data into a code string data. The code string data output from the adaptive bit allocation coding circuit 118 is then output from output terminal 119 of the high efficiency encoder of FIG. 13 as the first code string 1.

Then, referring to FIG. 14, the first code string 1 produced by the high efficiency encoder of FIG. 13 is supplied to input terminal 121 of the high efficiency decoder shown there. The code string data is then forwarded to spectrum decoding circuit 122.

The spectrum decoding circuit 122 forms spectrum signals out of the first code string data. Of the spectrum signals formed by the spectrum decoding circuit 122, the signal with the frequency band from 10 to 20 kHz is sent to IMDCT circuit 123; while the signal with the frequency band from 5 to 10 kHz is sent to IMDCT circuit 124 and the signal with the frequency band from 0 to 5 kHz is sent to IMDCT circuit 125.

The IMDCT circuits 123 through 125 perform an IMDCT processing operation on the respective signals and transform them into time series signals. The time series signal with the frequency band from 0 to 5 kHz obtained by the IMDCT circuit 125 and the time series signal with the frequency band from 5 to 10 kHz obtained by the IMDCT circuit 124 are then sent to band synthesis filter 127 and synthetically combined to make a time series signal with a frequency band from 0 to 10 kHz. The time series signal with the frequency band from 10 to 20 kHz obtained by the IMDCT circuit 123 is then made to pass through a delay circuit 126 showing a delay time corresponding to the delay time of the band synthesis filter 127. The time series signal with the frequency band from 0 to 10 kHz output from the band synthesis filter 127 and the time series signal with the frequency band from 10 to 20 kHz coming from the delay circuit 126 are then sent to band synthesis filter 128.

The band synthesis filter 128 synthetically combines the two time series signals with the different frequency bands in a manner as described above to produce a time series sample data covering the entire frequency band. The time series sample data covering the entire frequency band is then produced from output terminal 129 of the high efficiency decoder of FIG. 14.

Now, referring to FIG. 15, a time series sample data with a frequency band from 0 to 20 kHz is supplied to input terminal 131 of the high efficiency encoder as input signal. The input signal is divided into a signal with a frequency band from 0 to 5 kHz, signal with a frequency band from 5 to 10 kHz, a signal with a frequency band from 10 to 15 kHz and a signal with a frequency band from 15 to 20 kHz by sub-band filter 132 which may be a so-called PQF filter. The PQF filter may be replaced by a two-staged QMF filter.

The signal with the frequency band from 15 to 20 kHz and the signal with the frequency band from 10 to 15 kHz are sent respectively to MDCT circuits 133 and 134, while the signal with the frequency band from 5 to 10 kHz and the signal with the frequency band from 0 to 5 kHz are sent respectively to MDCT circuits 135 and 136. The signals are subjected to a MDCT processing operation by the respective MDCT circuits. The spectrum data obtained as a result of the MDCT processing operations of the MDCT circuits 133 through 136 are then transformed into a code string data by an adaptive bit allocation coding circuit 137.

The code string data output from the adaptive bit allocation coding circuit 137 is then output from output terminal 138 of the high efficiency encoder of FIG. 15 as the second code string 2.

Then, referring to FIG. 16, the second code string 2 produced by the high efficiency encoder of FIG. 15 is supplied to input terminal 141 of the high efficiency decoder shown there. The code string data is then forwarded to spectrum decoding circuit 142.

The spectrum decoding circuit 142 forms spectrum signals by decoding the code string data input to it. Of the spectrum signals formed by the spectrum decoding circuit 142, the signal with the frequency band from 15 to 20 kHz is sent to IMDCT circuit 143 and the signal with the frequency band from 10 to 15 kHz is sent to IMDCT circuit 144, while the signal with the frequency band from 5 to 10 kHz is sent to IMDCT circuit 145 and the signal with the frequency band from 0 to 5 kHz is sent to IMDCT circuit 146.

The IMDCT circuits 143 through 146 perform an IMDCT processing operation on the respective signals and transform them into time series signals. The time series signals with the respective frequency bands output from the respective IMDCT circuits 143 through 146 are then input to band synthesis filter 147.

The band synthesis filter 147 synthetically combines the time series data supplied to it and produces a time series sample data covering the entire frequency band.

The time series sample data covering the entire frequency band from 0 to 20 kHz is then output from output terminal 148 of the high efficiency decoder of FIG. 16.

Now, the code string transform device of FIG. 17 adapted to transform the first code string into the second code string by means of a high efficiency encoder and a high efficiency decoder to which general MDCT and IMDCT are applicable will be described below.

Referring to FIG. 17, the first code string 1 is input to input terminal 151 as code string data and forwarded to spectrum decoding circuit 152. The spectrum decoding circuit 152 forms spectrum signals by decoding the first code string data. Of the spectrum signals formed by the spectrum decoding circuit 152, the signal with the frequency band from 10 to 20 kHz is sent to IMDCT circuit 153, while the signal with the frequency band from 5 to 10 kHz is sent to IMDCT circuit 154 and the signal with the frequency band from 0 to 5 kHz is sent to IMDCT circuit 155.

The IMDCT circuits 153 through 154 perform an IMDCT processing operation on the spectrum signals fed to them and transform them into respective time series signals. The time series signal with the frequency band from 10 to 20 kHz obtained as a result of the IMDCT processing operation of the IMDCT circuit 153 is sent to sub-band filter circuit 156, which divides the time series signal into a signal with a frequency band from 15 to 20 kHz and a signal with a frequency band from 10 to 15 kHz.

On the other hand, the time series signal with a frequency band from 5 to 10 kHz obtained as a result of the IMDCT processing operation of the IMDCT circuit 154 and the time series signal with a frequency band from 0 to 5 kHz obtained as a result of the IMDCT processing operation of the IMDCT circuit 155 are delayed by a time corresponding to the delay time of the sub-band filter 156 as they are made to pass respective delay circuits 157, 158.

Of the obtained time series signals with the four different frequency bands, the time series signal with the frequency band from 15 to 20 kHz is sent to MDCT circuit 159 and the time series signal with the frequency band from 10 to 15 kHz is sent to IMDCT circuit 160, whereas the time series signal with the frequency band from 5 to 10 kHz is sent to MDCT circuit 161 and the time series signal with the frequency band from 0 to 5 kHz is sent to IMDCT circuit 162. The time series signals are then subjected to an MDCT processing operation by the respective MDCT circuits. The spectrum data obtained by the MDCT processing operations of the MDCT circuits 159 through 162 are then sent to adaptive bit allocation coding circuit 163.

The adaptive bit allocation coding circuit 163 transforms the spectrum data obtained as a result of the MDCT processing operations of the MDCT circuits 159 through 162 into a code string data. The code-string data output from the adaptive bit allocation coding circuit 163 is then output from output terminal 164 of the high efficiency encoder of FIG. 17 as the second code string 2.

Now, the code string transform device of FIG. 18 adapted to transform the first code string into the second code string by means of a high efficiency encoder and a high efficiency decoder to which MDCT and IMDCT-according to the invention are applicable will be described below.

Referring to FIG. 18, the first code string 1 is input to input terminal 171 as code string data and forwarded to spectrum decoding circuit 172. The spectrum decoding circuit 172 forms spectrum signals by decoding the first code string data. Of the spectrum signals formed by the spectrum decoding circuit 172, the signal with the frequency band from 5 to 10 kHz is sent to IMDCT circuit 174 and the signal with the frequency band from 0 to 5 kHz is sent to IMDCT circuit 175.

Of the signal components with the frequency band from 10 to 20 kHz, if only the one with the frequency band from 10 to 15 kHz is necessary and hence the signal component with the frequency band above 15 kHz is unnecessary (or may be disregarded for a fast transform operation), the signal component with the frequency band 10 to 15 kHz out of the signal components with the frequency band from 10 to 20 kHz is subjected to a fast transform operation by the IMDCT circuit 173 adapted to IMDCT processing operations.

The time series signal with the frequency band from 10 to 15 kHz obtained as a result of the IMDCT processing operation of the IMDCT circuit 173 is then sent to MDCT circuit 176 and the time series signal with the frequency band from 5 to 10 kHz obtained as a result of the IMDCT processing operation of the IMDCT circuit 174 is sent to MDCT circuit 177, while the time series signal with the frequency band from 0 to 5 kHz obtained as a result of the IMDCT processing operation of the IMDCT circuit 175 is sent to MDCT circuit 178. The time series signals are then subjected to an MDCT processing operation by the respective MDCT circuits 176 through 178 to produce spectrum data, which are then sent to adaptive bit allocation coding circuit 179.

The adaptive bit allocation coding circuit 179 transforms the spectrum data obtained as a result of the MDCT processing operations of the MDCT circuits 176 through 178 into a code string data. The code string data output from the adaptive bit allocation coding circuit 179 is then output from output terminal 180 of the high efficiency encoder of FIG. 18 as the second code string 2.

As described above, the arrangement of FIG. 18 according to the invention can be realized without a sub-band filter and a delay circuit to simplify the circuit configuration when compared with that of FIG. 17 because of the provision of the IMDCT circuit 173 for performing IMDCT processing operations according to the invention. Furthermore, the circuits for performing IMDCT and MDCT processing operations on signals with the frequency band from 15 to 20 kHz required in the arrangement of FIG. 17 are no longer necessary for the arrangement of FIG. 18 because no such processing operations are conducted on signal with the frequency band from 15 to 20 kHz. Generally speaking, when the second code string 2 is one to be transmitted highly efficiently with a low transfer rate (bits/second), the signal components of the code string at the low frequency side need to be provided with a sufficiently large amount of information and, therefore, there may be cases where some of the signal components at the high frequency side may have to be cut away. In such a case, the above arrangement according to the invention will be particularly effective and advantageous.

Now, the code string transform device of FIG. 19 adapted to transform the second code string 2 into the first code string 1 by means of a high efficiency encoder and a high efficiency decoder to which general MDCT and IMDCT are applicable will be described below.

Referring to FIG. 19, the second code string 2 is input to input terminal 191 as code string data and forwarded to spectrum decoding circuit 192. The spectrum decoding circuit 192 forms spectrum signals by decoding the second code string data. Of the spectrum signals formed by the spectrum decoding circuit 192, the signal with the frequency band from 15 to 20 kHz is sent to IMDCT circuit 193 and the signal with the frequency band from 10 to 15 kHz is sent to IMDCT circuit 194 while the signal with the frequency band from 5 to 10 kHz is sent to IMDCT circuit 195 and the signal with the frequency band from 0 to 5 kHz is sent to IMDCT circuit 196.

The IMDCT circuits 193 through 195 perform an IMDCT processing operation on the spectrum signals fed to them and transform them into respective time series signals. The time series signal with the frequency band from 15 to 20 kHz obtained as a result of the IMDCT processing operation of the IMDCT circuit 193 and the time series signal with the frequency band from 10 to 15 kHz obtained as a result of the IMDCT processing operation of the IMDCT circuit 194 are sent to band synthesis filter circuit 197, which synthetically combines the time series signals to a signal with a frequency band from 10 to 20 kHz.

On the other hand, the time series signal with a frequency band from 5 to 10 kHz obtained as a result of the IMDCT processing operation of the IMDCT circuit 195 and the time series signal with a frequency band from 0 to 5 kHz obtained as a result of the IMDCT processing operation of the IMDCT circuit 196 are delayed by a time corresponding to the delay time of the band synthesis filter 197 as they are made to pass respective delay circuits 198, 199.

Of the obtained time series signals with the three different frequency bands, the time series signal with the frequency band from 10 to 20 kHz is sent to MDCT circuit 200 whereas the time series signal with the frequency band from 5 to 10 kHz is sent to MDCT circuit 201 and the time series signal with the frequency band from 0 to 5 kHz is sent to MDCT circuit 202. The time series signals are then subjected to an MDCT processing operation by the respective MDCT circuits. The spectrum data obtained by the MDCT processing operations of the MDCT circuits 200 through 202 are then sent to adaptive bit allocation coding circuit 203.

The adaptive bit allocation coding circuit 203 transforms the spectrum data obtained as a result of the MDCT processing operations of the MDCT circuits 201 through 203 into a code string data. The code string data output from the adaptive bit allocation coding circuit 203 is then output from output terminal 204 of the high efficiency encoder of FIG. 19 as the first code string 1.

Now, the code string transform device of FIG. 20 adapted to transform the second code string 2 into the first code string 1 by means of a high efficiency encoder and a high efficiency decoder to which MDCT and IMDCT according to the invention are applicable will be described below.

Referring to FIG. 20, the second code string 2 is input to input terminal 211 as code string data and forwarded to spectrum decoding circuit 212. The spectrum decoding circuit 212 forms spectrum signals by decoding the second code string 2 data. Of the spectrum signals formed by the spectrum decoding circuit 212, the signal with the frequency band from 5 to 10 kHz is sent to IMDCT circuit 214 and the signal with the frequency band from 0 to 5 kHz is sent to IMDCT circuit 215.

Of the signal components with the frequency band from 10 to 20 kHz, if only the one with the frequency band from 10 to 15 kHz is necessary and hence the signal component with the frequency band above 15 kHz is unnecessary (or may be disregarded for a fast transform operation), the signal component with the frequency band 10 to 15 kHz out of the signal components with the frequency band from 10 to 20 kHz is sent to IMDCT circuit 213.

The time series signal with the frequency band from 10 to 15 kHz obtained as a result of the IMDCT processing operation of the IMDCT circuit 213 is then sent to MDCT circuit 216 and the time series signal with the frequency band from 5 to 10 kHz obtained as a result of the IMDCT processing operation of the IMDCT circuit 214 is sent to MDCT circuit 217, while the time series signal with the frequency band from 0 to 5 kHz obtained as a result of the IMDCT processing operation of the IMDCT circuit 215 is sent to MDCT circuit 218. The time series signals are then subjected to an MDCT processing operation by the respective MDCT circuits 216 through 218 to produce spectrum data, which are then sent to adaptive bit allocation coding circuit 219.

The adaptive bit allocation coding circuit 219 transforms the spectrum data obtained as a result of the MDCT processing operations of the MDCT circuits 216 through 218 into a code string data. The code string data output from the adaptive bit allocation coding circuit 219 is then output from output terminal 220 of the high efficiency encoder of FIG. 20 as the first code string 1.

As described above, the arrangement of FIG. 20 according to the invention can be realized without a sub-band filter and a delay circuit to simplify the circuit configuration when compared with that of FIG. 19 because of the provision of the MDCT circuit 216 for performing MDCT processing operations according to the invention. Furthermore, the circuits for performing IMDCT and MDCT processing operations on signals with the frequency band from 15 to 20 kHz required in the arrangement of FIG. 19 are no longer necessary for the arrangement of FIG. 20 because no such processing operations are conducted on signal with the frequency band from 15 to 20 kHz. Generally speaking, when the second code string 2 is one to be transmitted highly efficiently with a low transfer rate (bits/second), the signal components of the code string at the low frequency side need to be provided with a sufficiently large amount of information and, therefore, there may be cases where some of the, signal components at the high frequency side may have to be cut away. In such a case, the above arrangement according to the invention will be particularly effective and advantageous.

What is claimed is:

1. A signal processing device comprising:
   a first transform unit for decoding a first code string produced by coding a first spectrum signal obtained by performing a direct modified discrete cosine transform on a time series signal, and transforming the first spectrum signal obtained by the decoding into a time series signal by performing an inverse modified discrete cosine transform; and
   a second transform unit for transforming the time series signal output from said first transform unit into a second spectrum signal by performing a direct modified discrete cosine transform and coding the second spectrum signal into a second code string,
   wherein,
   upon generation of a signal band of said second code string narrower than that of said first code string, said first transform unit performs a fast Fourier transform computation to be carried out for said inverse modified discrete cosine transform, using a tap length corresponding to said narrowed band, to increase computational speed and reduce computational storage of the fast Fourier transform of the time series signal.

2. A signal processing device comprising:
   a first transform unit for decoding a first code string produced by coding spectrum signals obtained by performing a direct modified discrete cosine transform on each of the signals obtained by dividing a time series signal into a plurality of bands, transforming the spectrum signals obtained by the decoding into time series signals by performing an inverse modified discrete cosine transform and synthetically combining the bands; and
   a second transform unit for transforming the time series signal output from said first transform unit into a spectrum signal by performing a direct modified discrete cosine transform and coding the spectrum signal into a second code string,
   wherein,
   upon generation of specific ones of said signal bands of said second code string narrower than corresponding ones of the signal bands of said first code string, said first transform unit performing a fast Fourier transform computation to be carried out for said inverse modified discrete cosine transform, using a tap length corresponding to said narrowed bands, to increase computational speed and reduce computational storage of the fast Fourier transform of the time series signal.

3. The signal processing device according to claim 2, wherein
   said first code string is formed by dividing the frequency band of the time series signal into octave sub-bands, transforming the signals of each sub-bands into a spectrum signal by unit of modified discrete cosine transform, and encoding the obtained spectrum signal; and
   said second transform unit is adapted to divide the frequency band of the time series signal output from said first transform unit into equal sub-bands and subsequently encoding the signals in the equal sub-bands.

4. The signal processing device according to claim 2, wherein
   said first code string is formed by dividing the frequency band of the time series signal into equal sub-bands, transforming each of the signals having one of the sub-bands into a spectrum signal by unit of modified discrete cosine transform, and encoding the obtained spectrum signal; and
   said second transform unit is adapted to divide frequency band of the time series signal output from said first transform unit into octave sub-bands and subsequently encoding the signals in the octave sub-bands.

5. A signal processing device comprising:
   a first transform unit for decoding a first code string produced by coding a first spectrum signal obtained by performing a direct modified discrete cosine transform on a time series signal, and transforming the first spectrum signal obtained by the decoding into a time series signal by performing an inverse modified discrete cosine transform; and
   a second transform unit for transforming the time series signal output from said first transform unit into a second spectrum signal by performing a direct modified discrete cosine transform and coding the second spectrum signal into a second code string, wherein,
upon generation of a signal band of said second code string narrower than that of said first code string, said second transform unit performing a fast Fourier transform computation to be carried out for said direct modified discrete cosine transform, using a tap length corresponding to said narrowed band, to increase computational speed and reduce computational storage of the fast Fourier transform of the time series signal.

6. A signal processing device comprising:
first transform unit for decoding a first code string produced by coding first spectrum signals obtained by performing a direct modified discrete cosine transform on each of the signals obtained by dividing the time series signal into a plurality of bands, transforming the first spectrum signals obtained by the decoding into time series signals by performing an inverse modified discrete cosine transform and synthetically combining the bands;
a second transform unit for transforming the time series signal output from said first transform unit into a second spectrum signal by performing a direct modified discrete cosine transform and coding the second spectrum signal into a second code string,
wherein,
upon generation of specific ones of said signal bands of said second code string narrower than corresponding ones of the signal bands of said first code string, said second transform unit performing a fast Fourier transform computation to be carried out for said direct modified discrete cosine transform, using a tap length corresponding to said narrowed bands, to increase computational speed and reduce computational storage of the fast Fourier transform of the time series signal.

7. The signal processing device according to claim 6, wherein
said first code string is formed by dividing the frequency band of the time series signal into octave sub-bands, transforming the signals of each sub-bands into a spectrum signal by unit of modified discrete cosine transform, and encoding the obtained spectrum signal; and
said second transform unit is adapted to divide the frequency band of the time series signal output from said first transform unit into equal sub-bands and subsequently encoding the signals in the equal sub-bands.

8. The signal processing device according to claim 6, wherein said first code string is formed by dividing the frequency band of the time series signal into equal sub-bands, transforming each of the signals having one of the sub-bands into a spectrum signal by unit of modified discrete cosine transform and encoding the obtained spectrum signal; and
said second transform unit is adapted to divide frequency band of the time series signal output from said first transform unit into octave sub-bands and subsequently encoding the signals in the octave sub-bands.

9. A signal processing device comprising:
a first transform step of decoding a first code string produced by coding a first spectrum signal obtained by performing a direct modified discrete cosine transform on the time series signal, and transforming the first spectrum signal obtained by the decoding into a time series signal by performing an inverse modified discrete cosine transform;
a second transform step of transforming the time series signal output from said first transform step into a second spectrum signal by performing a direct modified discrete cosine transform and coding the second spectrum signal into a second code string,
wherein,
upon generation of the signal band of said second code string narrower than that of said first code string, a fast Fourier transform computation to be carried out for said inverse modified discrete cosine transform being performed in said first transform step, using a tap length corresponding to said narrowed band, to increase computational speed and reduce computational storage of the fast Fourier transform of the time series signal.

10. A signal processing device comprising:
a first transform step of decoding a first code string produced by coding a first spectrum signals obtained by performing a direct modified discrete cosine transform on each of the signals obtained by dividing the time series signal into a plurality of bands, transforming the first spectrum signals obtained by the decoding into time series signals by performing an inverse modified discrete cosine transform and synthetically combining the bands;
a second transform step of transforming the time series signal output from said first transform step into a second spectrum signal by performing a direct modified discrete cosine transform and coding the second spectrum signal into a second code string,
wherein,
upon generation of specific ones of said signal bands of said second code string narrower than corresponding ones of the signal bands of said first code string, a fast Fourier transform computation to be carried out for said inverse modified discrete cosine transform being performed in said first transform step, using a tap length corresponding to said narrowed bands, to increase computational speed and reduce computational storage of the fast Fourier transform of the time series signal.

11. The signal processing method according to claim 10, wherein
said first code string is formed by dividing the frequency band of the time series signal into octave sub-bands, transforming the signals of each sub-bands into a spectrum signal by unit of modified discrete cosine transform, and encoding the obtained spectrum signal; and
said second transform unit is adapted to divide the frequency band of the time series signal output from said first transform unit into equal sub-bands and subsequently encoding the signals in the equal sub-bands.

12. The signal processing method according to claim 10, wherein said first code string is formed by dividing the frequency band of the time series signal into equal sub-bands, transforming each of the signals having one of the sub-bands into a spectrum signal by unit of modified discrete cosine transform, and encoding the obtained spectrum signal; and
said second transform unit is adapted to divide frequency band of the time series signal output from said first transform unit into octave sub-bands and subsequently encoding the signals in the octave sub-bands.

13. A signal processing device comprising:
a first transform step of decoding a first code string produced by coding a first spectrum signal obtained by performing a direct modified discrete cosine transform on the time series signal, and transforming the first spectrum signal obtained by the decoding into a time series signal by performing an inverse modified discrete cosine transform;

a second transform step of transforming the time series signal output from said first transform step into a second spectrum signal by performing a direct modified discrete cosine transform and coding the second spectrum signal into a second code string, wherein, upon generation of the signal band of said second code string narrower than that of said first code string, a fast Fourier transform computation to be carried out for said direct modified discrete cosine transform being performed in said second transform step, using a tap length corresponding to said narrowed band, to increase computational speed and reduce computational storage of the fast Fourier transform of the time series signal.

14. A signal processing device comprising:

a first transform step of decoding a first code string produced by coding a first spectrum signals obtained by performing a direct modified discrete cosine transform on each of the signals obtained by dividing the time series signal into a plurality of bands, transforming the first spectrum signals obtained by the decoding into time series signals by performing an inverse modified discrete cosine transform and synthetically combining the bands;

a second transform step of transforming the time series signal output from said first transform step into a second spectrum signal by performing a direct modified discrete cosine transform and coding the second spectrum signal into a second code string, wherein, upon generation of specific ones of said signal bands of said second code string narrower than corresponding ones of the signal bands of said first code string, a fast Fourier transform computation to be carried out for said direct modified discrete cosine transform being performed in said second transform step, using a tap length corresponding to said narrowed bands, to increase computational speed and reduce computational storage of the fast Fourier transform of the time series signal.

15. The signal processing method according to claim 14, wherein said first code string is formed by dividing the frequency band of the time series signal into octave sub-bands, transforming the signals of each sub-bands into a spectrum signal by unit of modified discrete cosine transform and encoding the obtained spectrum signal; and said second transform step is adapted to divide the frequency band of the time series signal output from said first transform unit into equal sub-bands and subsequently encoding the signals in the equal sub-bands.

16. The signal processing method according to claim 14, wherein said first code string is formed by dividing the frequency band of the time series signal into equal sub-bands, transforming each of the signals having one of the sub-bands into a spectrum signal by unit of modified discrete cosine transform and encoding the obtained spectrum signal; and said second transform step is adapted to divide frequency band of the time series signal output from said first transform unit into octave sub-bands and subsequently encoding the signals in the octave sub-bands.

* * * * *